(12) United States Patent
Goro et al.

(10) Patent No.: US 9,077,981 B2
(45) Date of Patent: Jul. 7, 2015

(54) THREE-DIMENSIONAL DISPLAY APPARATUS

(71) Applicant: Samsung Display Co., Ltd., Yongin, Gyeonggi-Do (KR)

(72) Inventors: Hamagishi Goro, Hwaseong-si (KR); Seung Jun Yu, Yongin (KR); Sang Min Jeon, Yongin-si (KR)

(73) Assignee: Samsung Display Co., Ltd. (KR)

( * ) Notice: Subject to any disclaimer, the term of this patent is extended or adjusted under 35 U.S.C. 154(b) by 340 days.

(21) Appl. No.: 13/752,239

(22) Filed: Jan. 28, 2013

(65) Prior Publication Data

US 2013/0335537 A1    Dec. 19, 2013

(30) Foreign Application Priority Data

Jun. 15, 2012    (KR) .......................... 10-2012-0064214

(51) Int. Cl.
*H04N 13/04*    (2006.01)

(52) U.S. Cl.
CPC ....... *H04N 13/0402* (2013.01); *H04N 13/0409* (2013.01); *H04N 13/0413* (2013.01); *H04N 13/0468* (2013.01); *H04N 13/0475* (2013.01)

(58) Field of Classification Search
CPC .......... H04N 13/0402; H04N 13/0404; H04N 13/0406; H04N 13/0409; H04N 13/0418; H04N 13/0475; H04N 13/0468; H04N 13/0413; G06T 19/00; G06T 17/00; G06T 15/00; G02B 27/2214; G02B 27/2228
USPC ............. 348/53, 51, 54, 59; 349/15; 345/102, 345/419; 359/462, 463, 466
IPC ....................................................... H04N 13/04
See application file for complete search history.

(56) References Cited

U.S. PATENT DOCUMENTS

| | | | |
|---|---|---|---|
| 7,505,203 B2 * | 3/2009 | Nam et al. ...................... | 348/51 |
| 8,040,371 B2 | 10/2011 | Kim et al. | |
| 2010/0073465 A1 | 3/2010 | Park et al. | |
| 2011/0051239 A1 | 3/2011 | Daiku | |
| 2013/0009859 A1 * | 1/2013 | Woo et al. ...................... | 345/156 |
| 2013/0321482 A1 * | 12/2013 | Goro et al. .................... | 345/690 |

FOREIGN PATENT DOCUMENTS

| | | |
|---|---|---|
| JP | 3229824 B2 | 11/2001 |
| JP | 3668116 B2 | 7/2005 |
| JP | 2010-276965 A | 12/2010 |

(Continued)

*Primary Examiner* — Sherrie Hsia
(74) *Attorney, Agent, or Firm* — Innovation Counsel LLP

(57) ABSTRACT

In a 3D image display apparatus, a display unit includes a plurality of pixels and alternately displays a left-eye image in a first group of the pixels and a right-eye image in a second group of the pixels along a first direction, a barrier unit includes a light blocking portion blocking light received from the display unit and a light transmitting portion transmitting the light received from the display unit, and the light blocking portion and the light transmitting portion are alternately arranged in the first direction. A position information extraction unit determines the distance between the display unit and a viewer watching the display unit, and a control unit controls the display unit and the barrier unit in accordance with the distance information to allow the display unit and the barrier unit to be operated in a first mode or a second mode. Thus, a distance range in which the viewer perceives the 3D image increases.

25 Claims, 27 Drawing Sheets

(56) References Cited

FOREIGN PATENT DOCUMENTS

| KR | 10-2005-0056068 A | 6/2005 |
| KR | 10-2006-0011661 A | 2/2006 |
| KR | 10-2006-0096844 A | 9/2006 |
| KR | 10-2007-0001528 A | 1/2007 |
| KR | 10-2009-0056655 A | 6/2009 |
| KR | 10-2010-0076461 A | 7/2010 |

* cited by examiner

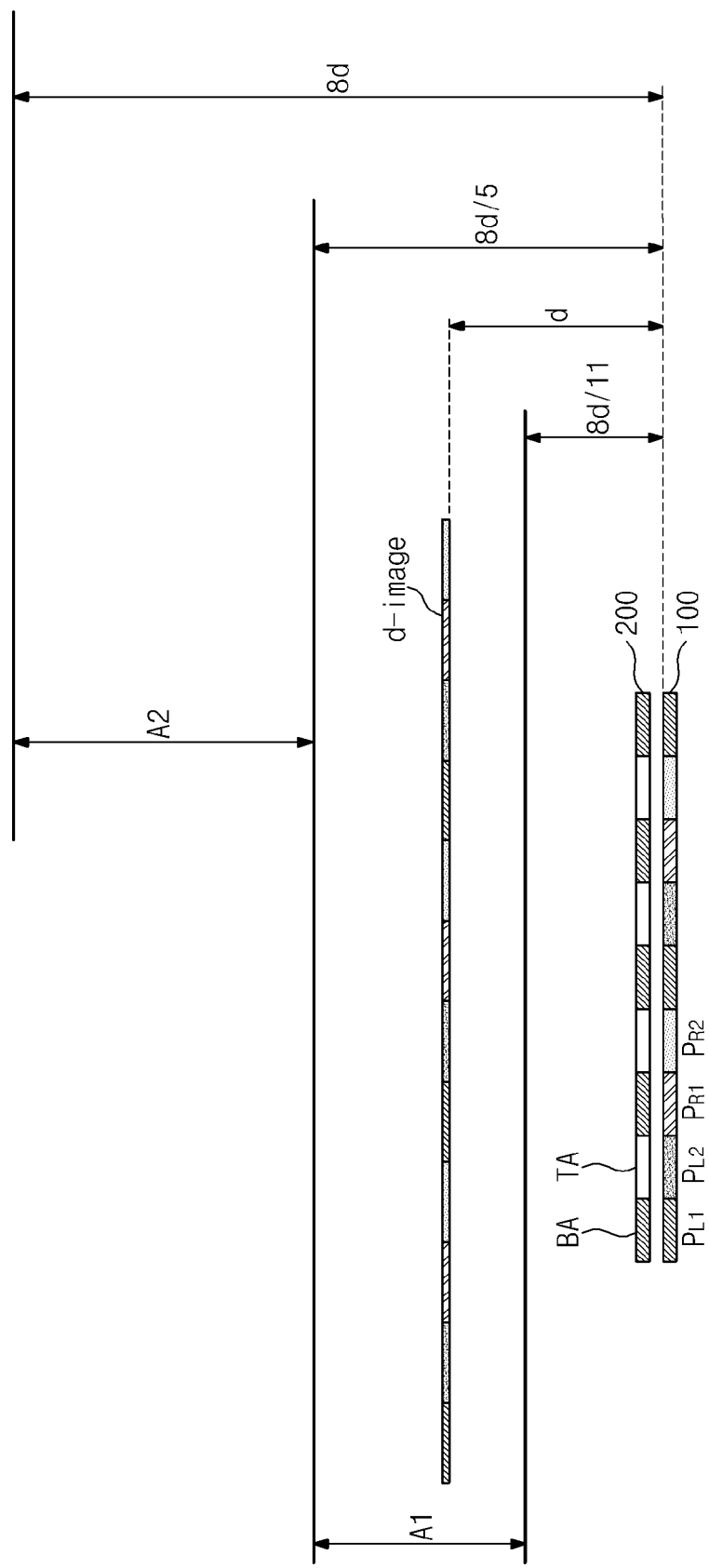

THREE-DIMENSIONAL DISPLAY APPARATUS

CROSS-REFERENCE TO RELATED APPLICATION

This application claims priority to Korean Patent Application No. 10-2012-0064214, filed on Jun. 15, 2012, and all the benefits accruing therefrom under 35 U.S.C. §119, the entire contents of which are hereby incorporated by reference.

BACKGROUND

1. Field

The disclosure relates to a three-dimensional display apparatus. More particularly, the disclosure relates to a three-dimensional display apparatus capable of displaying a two-dimensional image and a three-dimensional image.

2. Description of the Related Art

In general, a three-dimensional ("3D") image display apparatus provides a left-eye image and a right-eye image, which have a binocular disparity, to a left eye and a right eye of a viewer, respectively. To this end, a lenticular lens or a parallax barrier is disposed over and spaced apart from a display panel for a two-dimensional ("2D") image, and thus the viewer perceives different images through the left and right eyes thereof.

In a 3D image display apparatus that employs a lenticular lens, the left- and right-eye images are alternately arranged in a striped shape on a focal plane of the lenticular lens having a semi-cylindrical shape. Accordingly, the left- and right-eye images are separated from each other by the lenticular lens, so the viewer perceives the image as 3D without wearing special glasses.

In a 3D image display apparatus that employs a parallax barrier, slits are arranged in a striped shape at regular intervals in order to transmit or block the light, and the left- and right-eye images are alternately arranged in the front or rear side of the slits at a suitable interval. Therefore, the viewer separately recognizes the left- and right-eye images passing through the parallax barrier at a specific viewpoint, and thus the viewer perceives the 3D image, also without wearing special glasses.

SUMMARY

A 3D image display apparatus capable of widening a distance at which a viewer perceives a 3D image is provided.

A 3D image display apparatus includes a display unit, a barrier unit, a position information extraction unit, and a control unit.

The display unit includes a plurality of pixels and alternately displays a left-eye image in a first group of pixels and a right-eye image in a second group of pixels along a first direction. The barrier unit includes a light blocking portion blocking light received from the display unit and a light transmitting portion transmitting light received from the display unit, and the light blocking portion and the light transmitting portion are alternately arranged in the first direction.

The position information extraction unit determines a distance between the display unit and a viewer watching the display unit, and the control unit controls the display unit and the barrier unit in accordance with the distance to allow the display unit and the barrier unit to be operated in a first mode or a second mode.

In the first mode, the display unit alternately displays the left-eye image and the right-eye image in a unit of 2n (n is an integer of 1 or more) pixels and the barrier unit forms the light blocking portion and the light transmitting portion in a unit of 4n electrodes. In the second mode, the display unit alternately displays the left-eye image and the right-eye image in a unit of n pixels, and the barrier unit forms the light blocking portion and the light transmitting portion in a unit of 2n electrodes.

In another aspect, a 3D image display apparatus includes a display unit, a lenticular unit, a position information extraction unit, and a control unit.

The display unit includes a plurality of pixels and alternately displays a left-eye image in a first group of the pixels and a right-eye image in a second group of the pixels along a first direction, and the lenticular unit includes a plurality of lenses arranged in the first direction.

The position information extraction unit extracts the distance between the display unit and a viewer watching the display unit, and the control unit controls the display unit and the lenticular unit in accordance with the distance to allow the display unit and the lenticular unit to be operated in a first mode or a second mode.

In the first mode, the display unit alternately displays the left-eye image and the right-eye image in a unit of 2n (n is an integer of 1 or more) pixels, and the lenticular unit forms the lenses in a unit of 8n electrodes. In the second mode, the display unit alternately displays the left-eye image and the right-eye image in a unit of n pixels, and the lenticular unit forms the lenses in a unit of 4n electrodes.

According to the above, the display unit extracts information on the distance between the display unit and the viewer watching the display unit using the position information extraction unit, and the display unit and the barrier unit are operated in the first mode or the second mode in accordance with the distance information. In addition, the display unit is divided into a plurality of areas according to the distance information, and the barrier unit is controlled to form the barrier pattern allowing the viewer to perceive the 3D image in each area. Thus, the distance range in which the viewer perceives the 3D image may be widened and the barrier pattern is set in accordance with the position of the viewer. As a result, the viewer may perceive the optimal 3D image.

BRIEF DESCRIPTION OF THE DRAWINGS

The above and other advantages will become readily apparent by reference to the following detailed description when considered in conjunction with the accompanying drawings wherein:

FIG. 2 is a view showing a distance range within which a display unit and a barrier unit are operated in a first mode and a distance range within which the display unit and the barrier unit are operated in a second mode;

DETAILED DESCRIPTION

Figure 1:
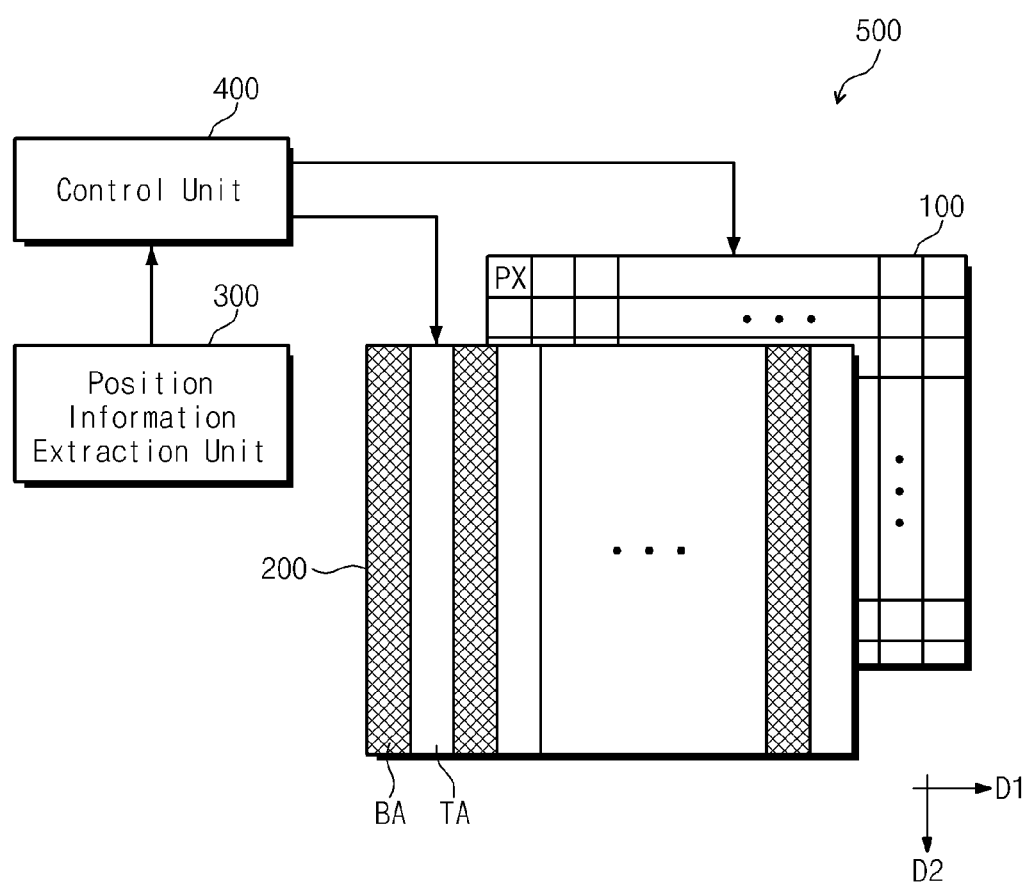
FIG. 1 is a block diagram showing an exemplary embodiment of a 3D image display apparatus.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

Spatially relative terms, such as "under", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments will be explained in detail with reference to the accompanying drawings.

FIG. 1 is a block diagram showing an exemplary embodiment of a 3D image display apparatus.

Referring to FIG. 1, the 3D image display apparatus 500 includes a display unit 100, a barrier unit 200, a position information extraction unit 300, and a control unit 400.

The display unit 100 includes a plurality of pixels PX. The pixels PX are arranged in the first direction D1 and a second direction D2 substantially perpendicular to the first direction D1. The display unit 100 alternately displays a left-eye image and a right-eye image along a first direction D1. For example, a first column of pixels along second direction D2 may display a left eye image, and the next column of pixels adjacent the first column in the first direction D1 displays a right eye image, etc.

The barrier unit 200 is disposed on the display unit 100, either above or below display unit 100. The barrier unit 200 includes a light blocking portion BA to block light, and a light transmitting portion TA to transmit light. The light blocking portion BA and the light transmitting portion TA are alternately arranged in the first direction D1. As an example, the light blocking portion BA and the light transmitting portion TA are extended in the second direction D2.

The position information extraction unit 300 extracts information about the position of a viewer who watches the display unit 100 relative to the display unit 100. In particular, the position information extraction unit 300 determines information about the vertical distance between the display unit 100 and the viewer (i.e., when the viewer is closer to or farther from the display unit 100) and also information about horizontal movement of the viewer in a direction substantially parallel to the panel surface plane of the display unit 100 (i.e., when the viewer moves sideways with respect to the display unit).

The control unit 400 controls the display unit 100 and the barrier unit 200 to be operated in either a first mode or a second mode in accordance with the position information provided by the position information extraction unit 300. In detail, when the 3D image display apparatus 500 displays a 2D image (hereinafter, referred to as a 2D image mode), the control unit 400 controls the barrier unit 200 to be turned off. However, when the 3D image display apparatus 500 displays a 3D image (hereinafter, referred to as a 3D image mode), the control unit 400 controls the barrier unit 200 to be turned on. In addition, when the 3D image display apparatus 500 is operated in the 3D image mode, the control unit 400 determines whether the display unit 100 and the barrier unit 200 need to be operated the first mode or the second mode on the basis of the position information, and the control unit 400 controls the display unit 100 and the barrier unit 200 to be operated in the determined mode. In particular, the control unit 400 selects either the first mode or the second mode in accordance with the vertical distance information.

For instance, when the first mode is used, the display unit 100 alternately displays the left-eye image and the right-eye image in the unit of 2n pixels (n is an integer of 1 or more), and the light blocking portion BA and the light transmitting portion TA of the barrier unit 200 are arranged in the unit of 4n electrodes. On the other hand when the second mode is used, the display unit 100 alternately displays the left-eye image and the right-eye image in the unit of n pixels, and the light blocking portion BA and the light transmitting portion TA of the barrier unit 200 are arranged in the unit of 2n electrodes.

In a case that the "n" is 1, when the first mode is used, the display unit 100 includes first and second left-eye pixels and first and second right-eye pixels arranged in the first direction D1. Hereinafter, left-eye images displayed in the first and second left-eye pixels are referred to as first and second left-eye images and right-eye images displayed in the first and second right-eye pixels are referred to as first and second right-eye images.

In the first mode, when "n" is 1, the barrier unit 200 includes four electrodes to define the light blocking portion BA and four electrodes to define the light transmitting portions TA. In this case, each of the light transmitting portion TA and the light blocking portion BA has a width corresponding to the first and second left-eye pixels or the first and second right-eye pixels.

Figure 3A:
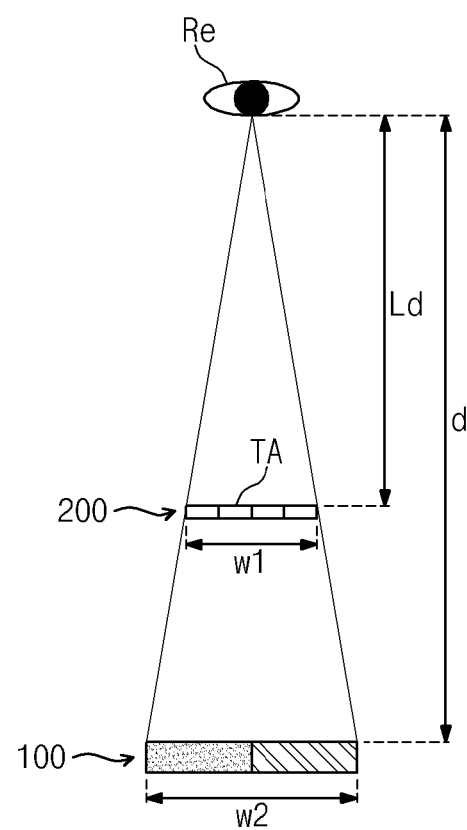
FIG. 3A is a view showing a process determining the width of the light transmitting portion.

FIG. 3A is a view showing a process determining the width of the light transmitting portion TA. The right eye Re, one of the light transmitting portion TA, and two pixels adjacent to each other are illustrated as an exemplary embodiment in FIG. 3a.

Referring to FIG. 3a, the width w1 of the light transmitting portion TA may be decided by the following Equation 0.

$$w1 = \frac{w2 \times Ld}{d} \qquad \text{Equation 0}$$

Herein, w1, w2, Ld, and d may indicate a width of a light transmitting portion, a width of two pixels adjacent to each other, a distance between a barrier unit, and appropriate visible distance, respectively. When the second mode is used, and the "n" is 1, the display unit 100 includes the left-eye pixel displaying the left-eye image and the right-eye pixel displaying the right-eye image. The left-eye pixel and the right-eye pixel are alternately arranged in the first direction D1.

In the second mode, the barrier unit 200 includes two electrodes to define the light blocking portion BA and two electrodes to define the light transmitting portion TA. In this case, each of the light transmitting portion TA and the light blocking portion BA has a width corresponding to the width of the left-eye pixel or the right-eye pixel. In addition, the width of the electrode is constant regardless of whether the first or second mode is used. Accordingly, the width of each of the light transmitting portion TA and the light blocking portion BA in the second mode is half times smaller than the width of each of the light transmitting portion TA and the light blocking portion BA in the first mode. In addition, the left-eye pixel (or the right-eye pixel) has the same width as the first left-eye pixel (or the first right-eye pixel).

Figure 3B:
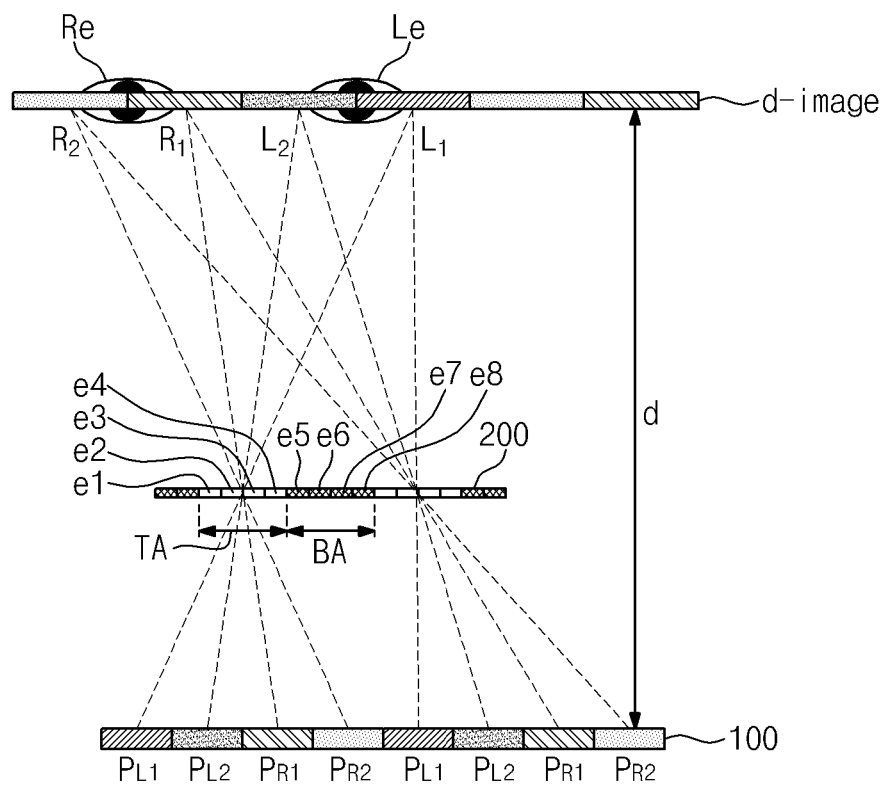
FIG. 3B is a view showing images perceived by two eyes of a viewer when the viewer is located at an appropriate visible distance shown in FIG. 2.

FIG. 2 is a view showing a distance range within which the display unit and the barrier unit are operated in the first mode and a distance range within which the display unit and the barrier unit are operated in the second mode. FIG. 3B is a view showing images perceived by two eyes of the viewer when the viewer is located at the appropriate visible distance shown in FIG. 2.

Referring to FIG. 2 and FIG. 3B, when the display unit 100 and the barrier unit 200 are operated in the first mode to display the 3D image, a reference distance is defined as the appropriate visible distance d. Hereinafter, for the convenience of explanation, the case in which the "n" is 1 in the first mode is referred to as a two-sub-pixel mode, and the case in which the "n" is 1 in the second mode is referred to as a one-sub-pixel mode.

In the two-sub-pixel mode (first mode, n=1), the display unit 100 displays the first and second left-eye images $L_1$ and $L_2$ and the first and second right-eye images $R_1$ and $R_2$ through the first and second left-eye pixels $P_{L1}$ and $P_{L2}$ and the first and second right-eye pixels $P_{R1}$ and $P_{R2}$, which are sequentially arranged along the first direction D1. The barrier unit 200 includes the light transmitting portion TA and the light blocking portion BA alternately arranged in the first direction D1. The light transmitting portion TA is formed by four electrodes: first to fourth electrodes e1, e2, e3, and e4. The light blocking portion BA is formed by four electrodes: fifth to eighth electrodes e5, e6, e7, and e8.

When the viewer watches the 3D image display apparatus 500 at the appropriate visible distance d, the right eye Re of the viewer perceives the first and second right-eye images $R_1$ and $R_2$ passing through the light transmitting portion TA, and the left eye Le of the viewer perceives the first and second left-eye images $L_1$ and $L_2$ passing through the light blocking portion BA. Thus, the viewer may perceive the image displayed on the display unit 100 as the 3D image due to a binocular disparity between two eyes Re and Le of the viewer.

The image perceived by the two eyes Re and Le of the viewer at the appropriate visible distance d may be defined as an appropriate visible image d-image. That is, when the viewer is located at the appropriate visible distance d in the two-sub-pixel mode, the viewer may perceive the optimal 3D image.

The display unit 100 and the barrier unit 200 are operated in the two-sub-pixel mode when the image is viewed at a distance from the display that is between the appropriate visible distance d and a point spaced apart from the display unit 100 by 8d/5. In addition, the display unit 100 and the barrier unit 200 are operated in the two-sub-pixel mode when the image is viewed at a distance from the display that is between the appropriate visible distance d and a point spaced apart from the display unit 100 by 8d/11.

That is, a distance range (hereinafter, referred to as a first range A1) in which the display unit 100 and the barrier unit 200 are operated in the two-sub-pixel mode may be defined as a range in which a vertical distance (hereinafter, referred to as an observation distance h) between the viewer and the surface plane of the display unit 100 (i.e., the distance the viewer sits away from the screen) satisfies the following Equation 1.

$$\frac{8d}{11} \le h \le \frac{8d}{5} \qquad \text{Equation 1}$$

Meanwhile, a distance range (hereinafter, referred to as a second range A2) in which the display unit 100 and the barrier unit 200 are operated in the one-sub-pixel mode (second mode, n=1) may be defined as a range in which the observation distance h satisfies the following Equation 2.

$$\frac{8d}{5} < h \le 8d \qquad \text{Equation 2}$$

Figure 4A:
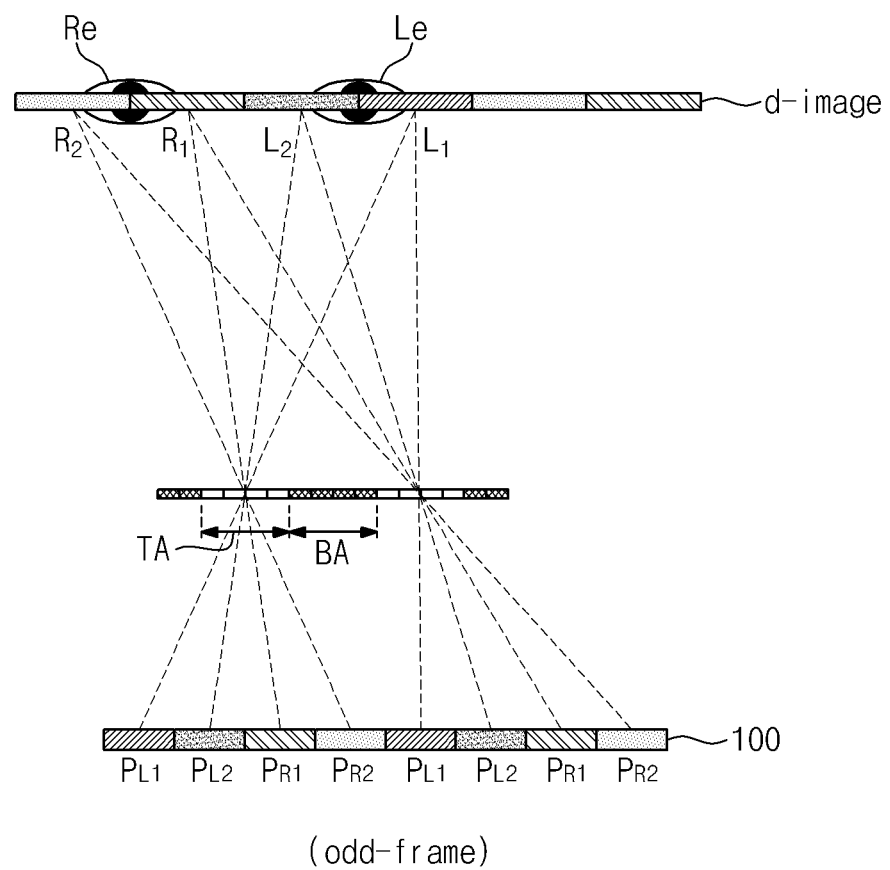
FIG. 4A is a view showing an odd-numbered frame of two-sub-pixel mode.
Figure 4B:
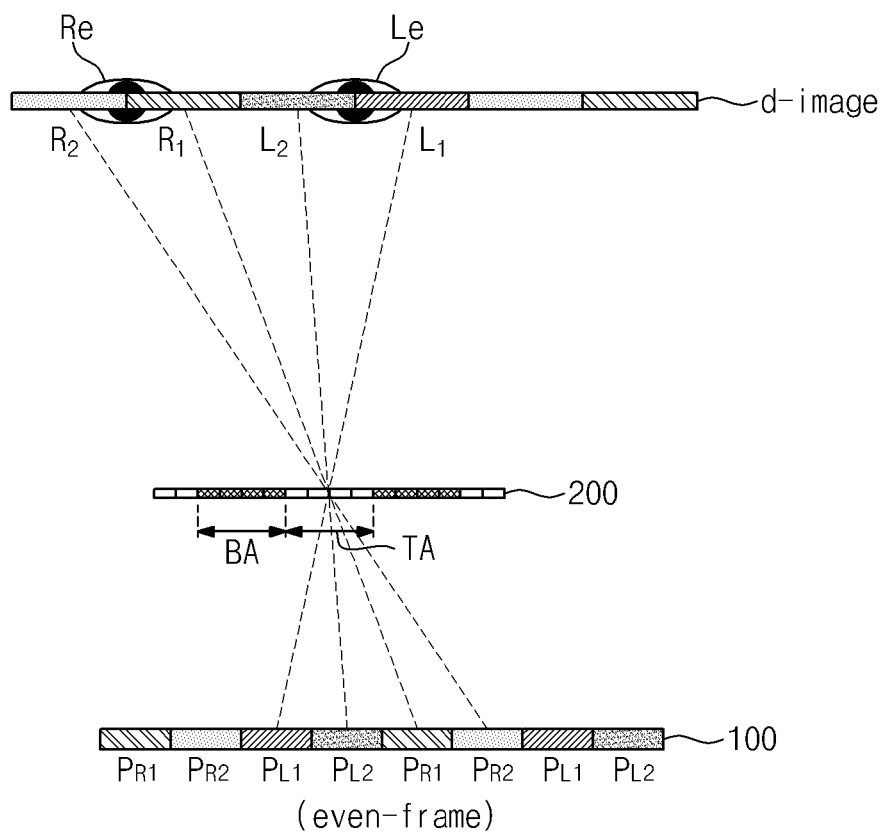
FIG. 4B is a view showing an even-numbered frame of two-sub-pixel mode.

FIG. 4A is a view showing an odd-numbered frame of the two-sub-pixel mode and FIG. 4B is a view showing an even-numbered frame of the two-sub-pixel mode.

Referring to FIG. 4A and FIG. 4B, in the 3D image mode, the 3D image display apparatus 500 may be operated in the odd-numbered frame and the even-numbered frame separately. When one frame period is defined as 1F if the image were to be display in the 2D image mode, for the 3D image mode the odd and even images are display in ½ F. That is, the odd-numbered frame in the 3D image mode corresponds to an earlier ½ period (earlier half-frame) of the 1F frame and the even-numbered frame in the 3D image mode corresponds to a later ½ period (later half-frame) of the 1F frame. Therefore, a driving frequency of the 3D image display apparatus 500 during the 3D image mode is two times greater than a driving frequency of the 3D image display apparatus 500 during the 2D image mode. For instance, the 3D image display apparatus 500 is operated at a frequency of about 60 Hz during the 2D image mode and operated at a frequency of about 120 Hz during the 3D image mode.

When the display unit 100 and the barrier unit 200 are operated in the two-sub-pixel mode of the 3D image mode, the first and second left-eye pixels $P_{L1}$ and $P_{L2}$ and the first and second right-eye pixels $P_{R1}$ and $P_{R2}$ are shifted by two pixels in the first direction D1 in the unit of a half-frame. In detail, the first and second left-eye pixels $P_{L1}$ and $P_{L2}$ of the odd-numbered frame are changed to the first and second right-eye pixels $P_{R1}$ and $P_{R2}$ in the even-numbered frame, and the first and second right-eye pixels $P_{R1}$ and $P_{R2}$ of the odd-frame are changed to the first and second left-eye pixels $P_{L1}$ and $P_{L2}$ in the even-numbered frame.

Similarly, the light transmitting portion TA and the light blocking portion BA of the barrier unit 200 are shifted in the first direction D1 by four electrodes in the unit of half-frame. In detail, the light transmitting portion TA of the odd-numbered frame is changed to the light blocking portion BA in the even-numbered frame, and the light blocking portion BA of the odd-numbered frame is changed to the light transmitting portion TA in the even-numbered frame.

Figure 5:
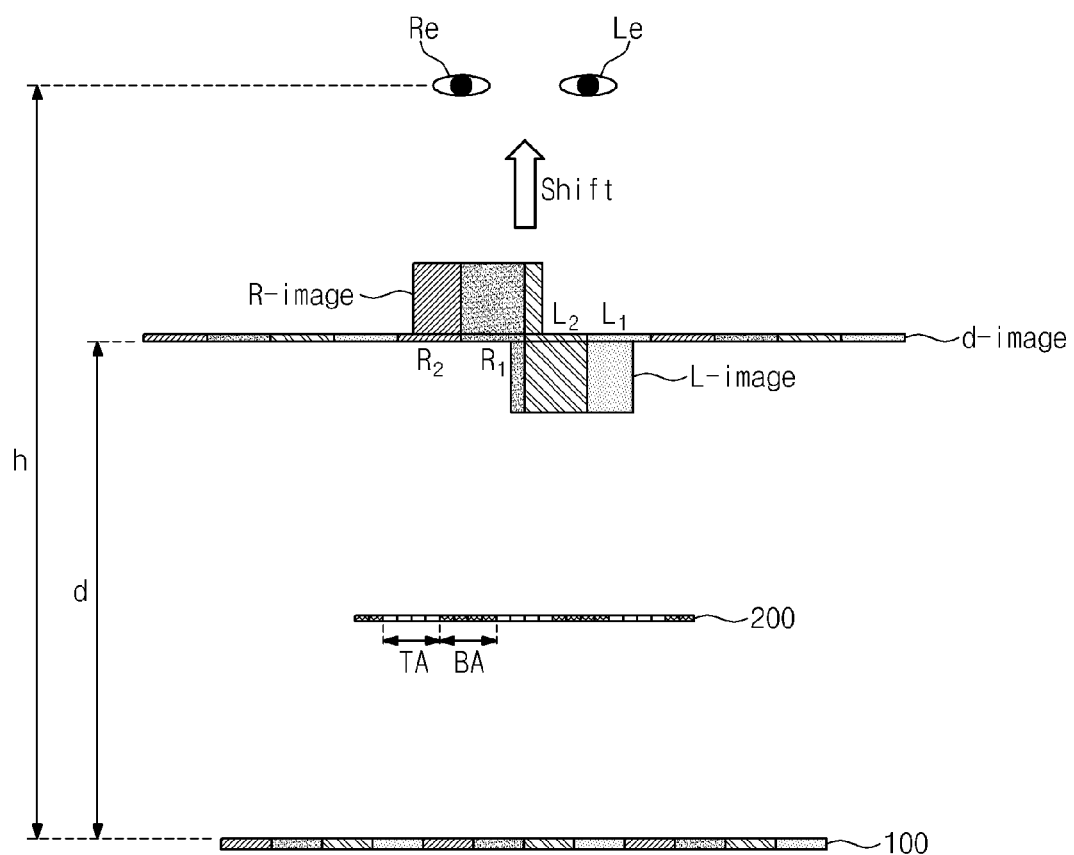
FIG. 5 is a view showing an observation distance greater than the appropriate visible distance.
Figure 6:
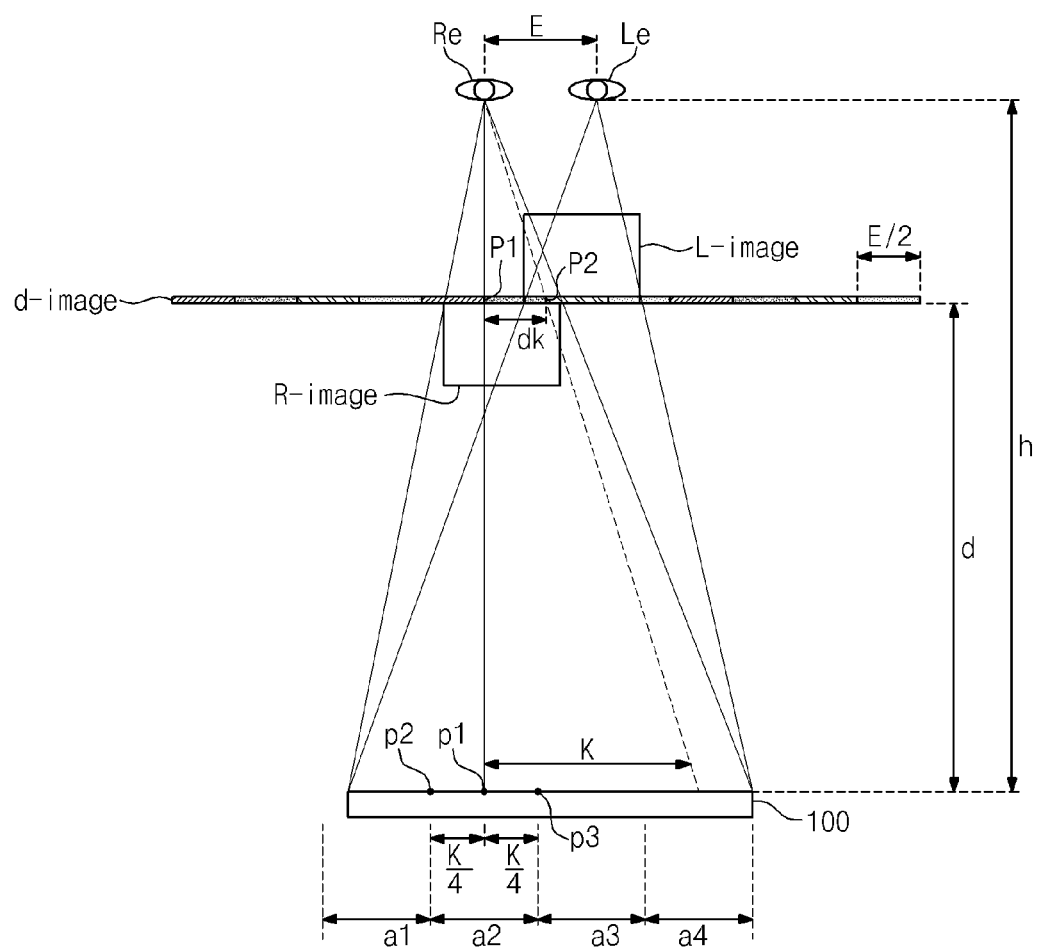
FIG. 6 is a view showing a right-eye image and a left-eye image respectively perceived by two eyes of the viewer when the observation distance is greater than the appropriate visible distance.

FIG. 5 is a view showing an observation distance that is greater than the appropriate visible distance, and FIG. 6 is a view showing the right-eye image and the left-eye image respectively perceived by two eyes of the viewer when the observation distance is greater than the appropriate visible distance.

Referring to FIG. 5, when the viewer is farther away from the display unit 100 than the appropriate visible distance d in the first range A1 in which the display unit 100 is operated in the two-sub-pixel mode, the viewer perceives a different image from the appropriate visible image d-image that is intended.

While, at the appropriate visible distance d, the first and second right-eye images $R_1$ and $R_2$ are perceived by the right eye Re of the viewer, when the observation distance h is greater than the appropriate visible distance d, the first right-eye image $R_1$, the second right-eye image $R_2$, and a portion of the second left-eye image $L_2$ are perceived by the right eye Re of the viewer Hereinafter, the image perceived by the right-eye Re at the observation distance h is referred to as a right-eye visible image R-image.

In addition, while, at the appropriate visible distance d, the first and second left-eye images $L_1$ and $L_2$ are perceived by the left eye Le of the viewer, when the observation distance h is greater than the appropriate visible distance d the first left-eye image $L_1$, the second left-eye image $L_2$, and a portion of the first right-eye image $R_1$ are perceived by the left eye Le of the viewer. Hereinafter, the image perceived by the left-eye Le at the observation distance h is referred to as a left-eye visible image L-image.

Thus, when the second left-eye image component and the first right-eye image component are removed from the right-eye visible image R-image and the left-eye visible image L-image, respectively, the viewer may perceive the 3D image at the observation distance h due to the binocular disparity of the two eyes.

As an example, a screen of the display unit 100 is divided into a plurality of areas each having a k/2 width described in more detail below, and the barrier unit 200 includes a predetermined barrier pattern corresponding to each area. When assuming that the display unit 100 is divided into the areas with respect to the right eye of the viewer, the barrier pattern may be set in each area to remove the second left-eye image component from the right-eye visible image R-image.

As shown in FIG. 6, a distance (hereinafter, referred to as binocular distance) between the left eye Le and the right eye Re of the viewer is defined as E. A distance, shown in FIG. 6 as distance dk, is the distance on d-image between a boundary point P1 between the first and second right-eye images R1 and R2 of the right-eye visible image R-image and a point P2 at which the first right-eye image R1 of the right-eye visible image R-image is finished. Particularly, the "dk" has a value corresponding to a half (E/2) of the binocular distance E at the appropriate visible distance d. The distance k is defined as the distance obtained by the projection of the distance dk as defined above onto the screen of the display unit 100. Accordingly, a relational expression is established as the following Equation 3.

$$h:k=(h-d):E/2 \qquad \text{Equation 3}$$

When Equation 3 is re-arranged about k, the k satisfies the following Equation 4.

$$k = \left| \frac{hE}{2(h-d)} \right| \qquad \text{Equation 4}$$

A reference area on the display unit 100 is set to an area between a second point p2 on the display 100 shifted leftward by a distance of k/4 from a first point p1, which is the point on a straight line extended from the boundary point P1 to the display unit 100, and a third point p3 shifted rightward by k/4 from the first point p1. Accordingly, the reference area has a width corresponding to k/2. In addition, areas, each having a width corresponding to k/2, are sequentially arranged rightward from the third point p3, and areas, each having a width corresponding to k/2, are sequentially arranged leftward from the second point p2.

As an example, the display unit 100 may be divided into first, second, third, and fourth areas a1, a2, a3, and a4 sequentially arranged in the first direction D1.

In FIG. 6, the first to fourth areas a1, a2, a3, and a4 are obtained by dividing the display unit 100 with reference to the right eye Re of the viewer, but they should not be limited thereto or thereby. That is, the display unit 100 may be divided in to the areas with reference to the left eye Le of the viewer.

Figure 7:
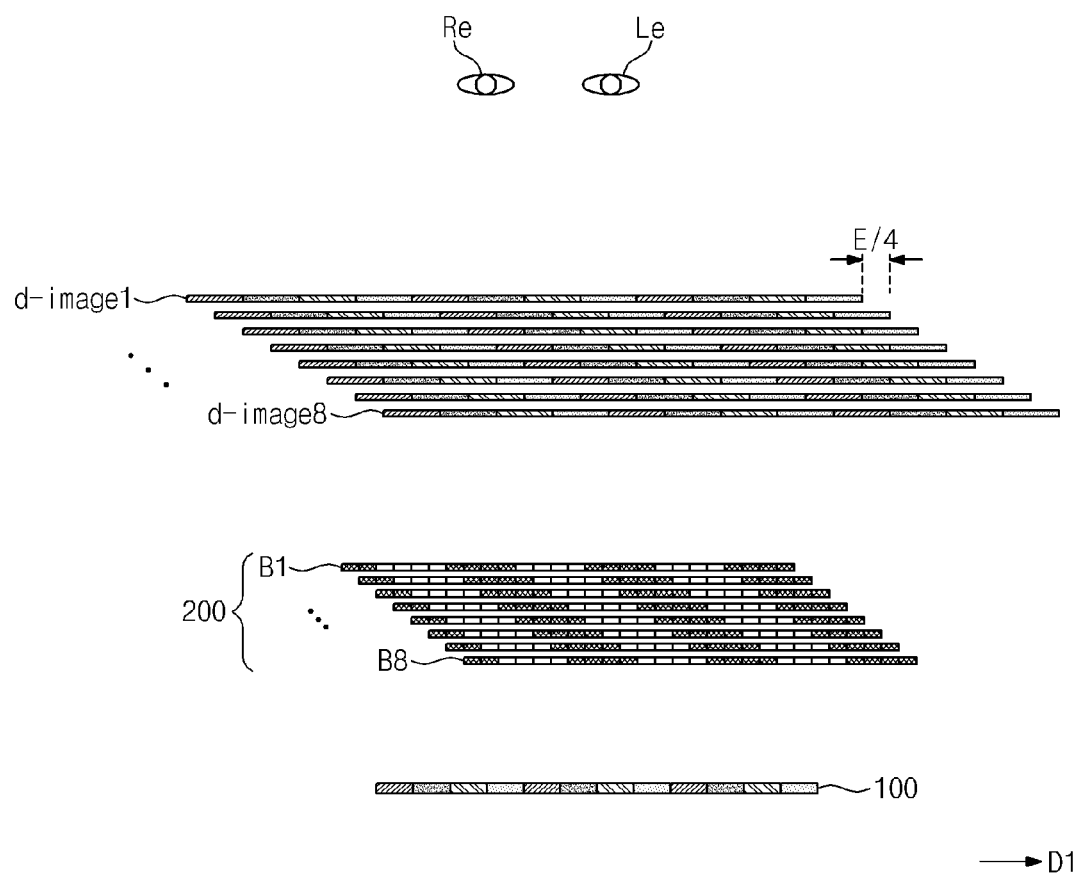
FIG. 7 is a view showing an appropriate visible image when a barrier unit includes first to eighth barrier patterns.

FIG. 7, FIG. 8, FIG. 9, FIG. 10A, and FIG. 10B are views showing processes of selecting the barrier pattern proper to each of the first to fourth areas. In detail, FIG. 7 is a view showing the appropriate visible image when the barrier unit includes first to eighth barrier patterns.

Referring to FIG. 7, the barrier unit 200 may be configured to have first to eighth barrier patterns B1, B2, B3, B4, B5, B6, B7, and B8 above the display unit 100. That is, the barrier unit 200 moves the light transmitting portion TA and the light blocking portion BA in the first direction D1 by the width of one electrode eight times to form the first to eighth barrier patterns B1 to B8. Accordingly, the first to eighth barrier patterns B1 to B8 have the shape in which the light transmitting portion TA is sequentially shifted to the first direction D1 by the width of one electrode. In other words, the light transmitting portions of the second to eighth barrier patterns B2, B3, B4, B5, B6, B7, and B8 are sequentially shifted respectively by widths respectively corresponding to one, two, three, four, five, six, and seven electrodes to the first direction D1 from a start point of the light transmitting portion TA of the first barrier pattern B1.

Meanwhile, in FIG. 7, a first appropriate visible image d-image1 is an image appearing at the appropriate visible distance d when the barrier unit 200 has the first barrier pattern B1, and a second appropriate visible image d-image2 is an image appearing at the appropriate visible distance d when the barrier unit 200 has the second barrier pattern B2 . A third appropriate visible image d-image3 and a fourth appropriate visible image d-image4 are images appearing at the appropriate visible distance d when the barrier unit 200 has the third and fourth barrier patterns B3 and B4, respectively. A fifth appropriate visible image d-image5 and a sixth appropriate visible image d-image6 are images appearing at the appropriate visible distance d when the barrier unit 200 has the fifth and sixth barrier patterns B5 and B6, respectively. A seventh appropriate visible image d-image7 and an eighth appropriate visible image d-image8 are images appearing at the appropriate visible distance d when the barrier unit 200 has the seventh and eighth barrier patterns B7 and B8, respectively. Thus, d-image1 to d-image8 in FIG. 7 show the eight images obtained at the appropriate visible distance d when the respective eight different barrier unit patterns are used with display unit 100.

As an example, in FIG. 7 the first to eighth appropriate visible images d-image1 to d-image8 are, by use of the barrier patterns in barrier unit 200, sequentially shifted to the first direction D1 by a width corresponding to one-fourth (E/4) of the binocular distance E.

The control unit 400 controls the barrier unit 200 to set the configuration of the barrier unit 200 to one of the first to eighth barrier patterns B1 to B8 corresponding to each area of the display unit 100.

In FIG. 7, for the convenience of explanation, the barrier unit 200 that forms the first to eighth barrier patterns B1 to B8 has been shown, but eight barrier units are not required to form the first to eighth barrier patterns B1 to B8.

Figure 8:
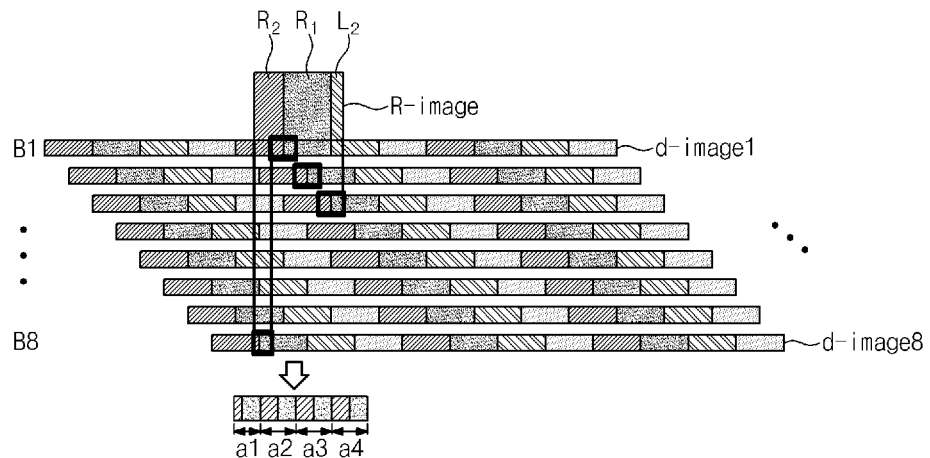
FIG. 8 is a view showing a process of selecting a barrier pattern to filter a second left-eye image component from a right-eye visible image in respective first to fourth areas.
Figure 10A:
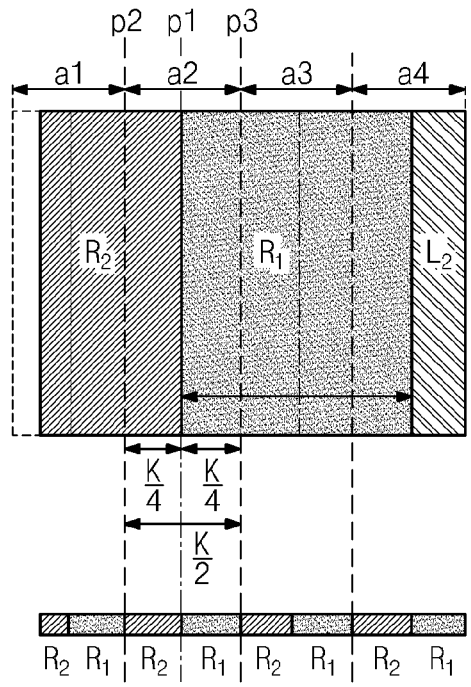
FIG. 10A is a view showing a right-eye visible image before being filtered and a right-eye visible image after being filtered.

FIG. 8 is a view showing a process of selecting the barrier pattern to filter the second left-eye image component from the right-eye visible image in respective first to fourth areas, and FIG. 10A is a view showing the right-eye visible image before being filtered and the right-eye visible image after being filtered.

Referring to FIG. 8, among the first to eighth barrier patterns B1 to B8, a barrier pattern that allows only the first and second right-eye images $R_1$ and $R_2$ to be perceived by the right eye Re of the viewer in each area is selected in each of the areas. In FIG. 8, the eight images d-image1 to d-image8 are shown and, along the left side of the eight images, the barrier pattern B1 to B8 that produces the corresponding image is labeled.

In detail, when the eighth barrier pattern B8 is applied to the first area a1, the right eye Re of the viewer perceives only the first and second right-eye images $R_1$ and $R_2$. This can be seen in FIG. 8 in the bold box on d-image8 over area a1 that shows d-image8 only displaying the right eye images $R_1$ and $R_2$. In addition, when the first barrier pattern B1 is applied to the second area a2, the right eye Re of the viewer perceives only the first and second right-eye images $R_1$ and $R_2$. When the second barrier pattern B2 is applied to the third area a3, the right eye Re of the viewer perceives only the first and second right-eye images $R_1$ and $R_2$. Further, when the third barrier pattern B3 is applied to the fourth area a4, the right eye Re of the viewer perceives only the first and second right-eye images $R_1$ and $R_2$.

Thus, the barrier unit 200 may be configured to form the eighth barrier pattern B8, the first barrier pattern B1, the second barrier pattern B2 , and the third barrier pattern B3 respectively corresponding to the first, second, third, and fourth areas a1, a2, a3, and a4.

As described above, when the barrier unit 200 having the above-described barrier pattern is applied to each area, the first left-eye image component is filtered from the right-eye visible image R-image, and thus the right eye Re of the viewer may perceive only the first and second right-eye images $R_1$ and $R_2$.

As shown in FIG. 10A, when the right-eye visible image R-image is projected from the screen of the display unit 100, a start point of the first right image $R_1$ corresponds to the first point p1 and the first right image $R_1$ has the width of the k. The second area a2 is defined as an area between the second point p2 shifted leftward from the first point p1 by k/4 and the third point p3 shifted rightward from the first point p1 by k/4. An area having a width of k/2 from the second point p2 to the left side of the second point p2 is defined as the first area a1. An area having a width of k/2 from the third point p3 to the right side of the third point p3 is defined as the third area a3, and an area having a width of k/2 from a right end point of the third area a3 to the right side of the right end point is defined as the fourth area a4.

When the eighth barrier pattern B8, the first barrier pattern B1, the second barrier pattern B2, and the third barrier pattern B3 are respectively applied to the first, second, third, and fourth areas a1, a2, a3, and a4, the right eye Re of the viewer may perceive only the first and second right-eye images $R_1$ and $R_2$ in each area.

Figure 9:
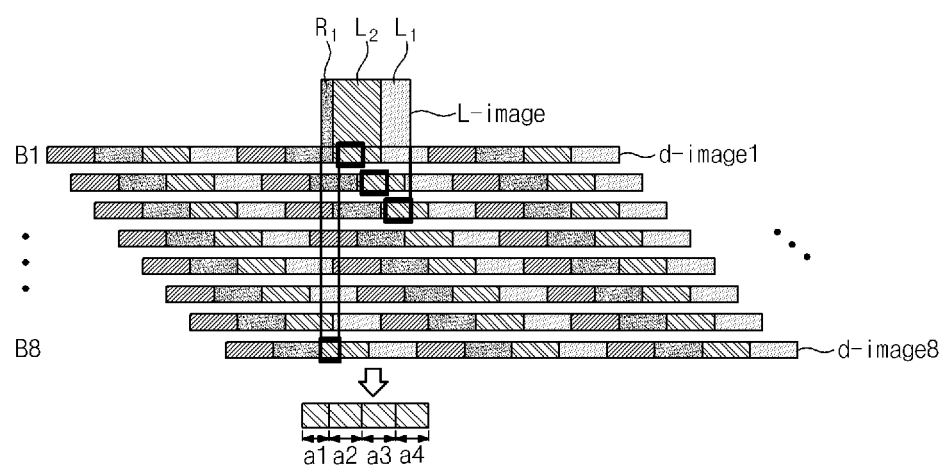
FIG. 9 is a view showing a process of filtering a left-eye visible image using a barrier pattern selected in respective first to fourth areas.
Figure 10B:
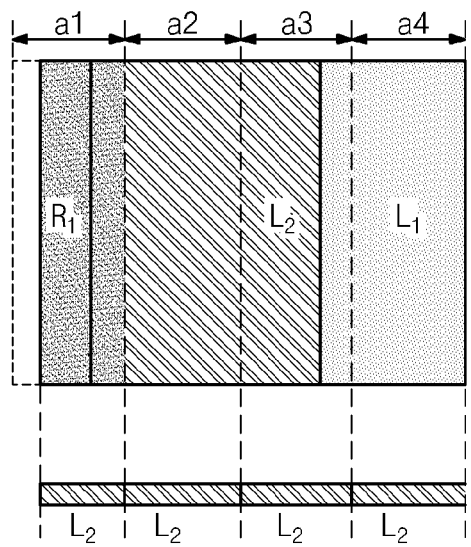
FIG. 10B is a view showing a left-eye visible image before being filtered and a left-eye visible image after being filtered.

FIG. 9 is a view showing a process of filtering the left-eye visible image using the barrier pattern selected in respective first to fourth areas, and FIG. 10B is a view showing a left-eye visible image before being filtered and a left-eye visible image after being filtered.

Referring to FIG. 9, when the eighth, first, second, and third barrier patterns B8, B1, B2, and B3 set with reference to the right eye Re are respectively applied to the first, second, third, and fourth areas a1, a2, a3, and a4, the second right-eye image component is filtered from the left-eye visible image L-image.

As shown in FIG. 10B, when the eighth barrier pattern B8, the first barrier pattern B1, the second barrier pattern B2, and the third barrier pattern B3 are respectively applied to the first, second, third, and fourth areas a1, a2, a3, and a4 with reference to the right eye Re of the viewer, the left eye Le of the viewer may perceive only the second left-eye image $L_2$ in each area.

Figure 11:
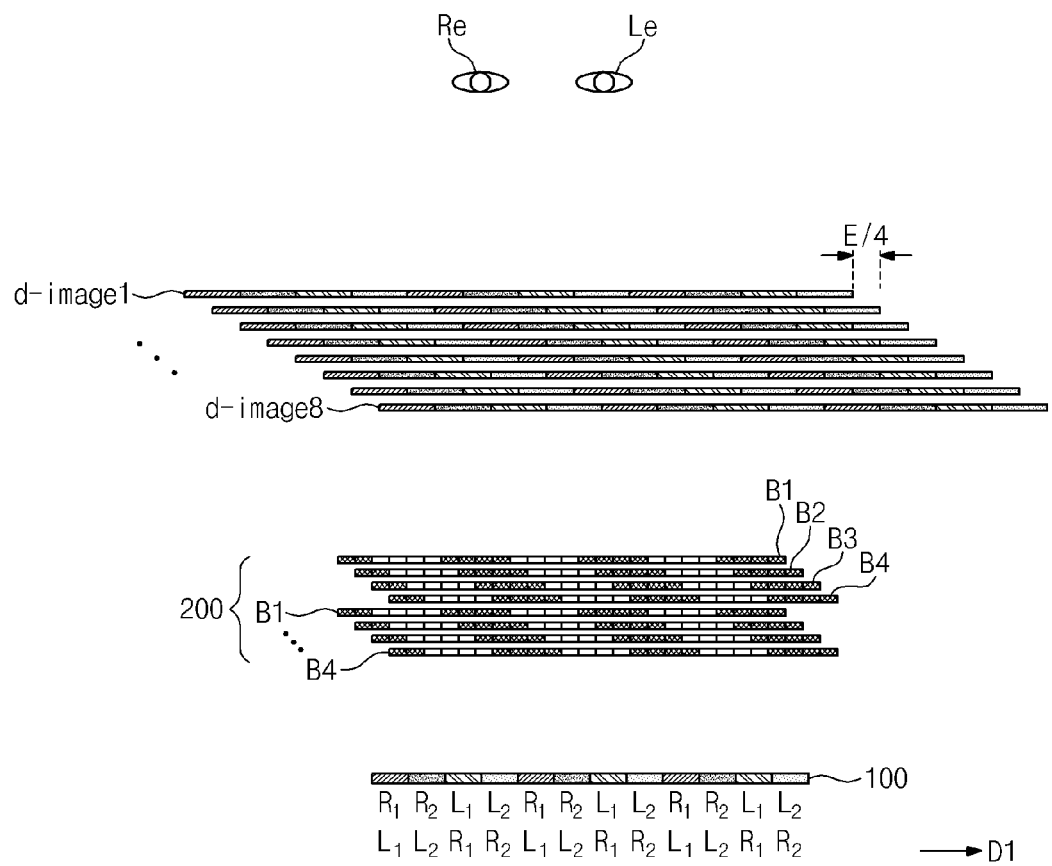
FIG. 11 is a view showing an appropriate visible image when an exemplary embodiment of a barrier pattern according to the invention includes first to fourth barrier patterns.

FIG. 11 is a view showing an appropriate visible image when an exemplary embodiment of a barrier pattern includes four barrier patterns and in which the display unit 100 alternates the positions in which the first and second right eye $R_1$ and $R_2$ and the first and second left eye images $L_1$ and $L_2$ are displayed.

Referring to FIG. 11, the barrier unit 200 may form first, second, third, and fourth barrier patterns B1, B2, B3, and B4 above the display unit 100. That is, the barrier unit 200 moves the light transmitting portion TA and the light blocking portion BA by the width of one electrode four times to form the first to fourth barrier patterns B1 to B4. Accordingly, the first to fourth barrier patterns B1 to B4 are each configured so that the light transmitting portion TA is sequentially shifted to the first direction D1 by the width of one electrode. In other words, the light transmitting portions of the second to fourth barrier patterns B2, B3, and B4 are sequentially shifted respectively by widths respectively corresponding to one, two, three electrodes to the first direction D1 from a start point of the light transmitting portion TA of the first barrier pattern B1.

In addition, the display unit 100 displays the first and second right-eye images $R_1$ and $R_2$ corresponding to the light transmitting portion TA or the first and second left-eye images $L_1$ and $L_2$ corresponding to the light transmitting portion TA when the barrier unit 200 forms each of the first, second, third, and fourth barrier patterns B1, B2, B3, and B4.

In FIG. 11, a first appropriate visible image d-image1 is an image appearing at the appropriate visible distance d in a first case in which the barrier unit 200 includes the first barrier pattern B1 and the display unit 100 displays the first and second right-eye images $R_1$ and $R_2$ corresponding to the light transmitting portion TA of the first barrier pattern B1. A second appropriate visible image d-image2 is an image appearing at the appropriate visible distance d in a second case in which the barrier unit 200 includes the second barrier pattern B2 and the display unit 100 displays the first and second right-eye images $R_1$ and $R_2$ corresponding to the light transmitting portion TA of the second barrier pattern B2.

A third appropriate visible image d-image3 is an image appearing at the appropriate visible distance d in a third case in which the barrier unit 200 includes the third barrier pattern B3 and the display unit 100 displays the first and second right-eye images $R_1$ and $R_2$ corresponding to the light transmitting portion TA of the third barrier pattern B3. A fourth appropriate visible image d-image4 is an image appearing at the appropriate visible distance d in a fourth case in which the barrier unit 200 includes the fourth barrier pattern B4 and the display unit 100 displays the first and second right-eye images $R_1$ and $R_2$ corresponding to the light transmitting portion TA of the fourth barrier pattern B4.

In FIG. 11, a fifth appropriate visible image d-image5 is an image appearing at the appropriate visible distance d in a fifth case in which the barrier unit 200 includes the first barrier pattern B1 and the display unit 100 displays the first and second left-eye images $L_1$ and $L_2$ corresponding to the light transmitting portion TA of the first barrier pattern B1. A sixth appropriate visible image d-image6 is an image appearing at the appropriate visible distance d in a sixth case in which the barrier unit 200 includes the second barrier pattern B2 and the display unit 100 displays the first and second left-eye images $L_1$ and $L_2$ corresponding to the light transmitting portion TA of the second barrier pattern B2.

A seventh appropriate visible image d-image7 is an image appearing at the appropriate visible distance d in a seventh case in which the barrier unit 200 includes the third barrier pattern B3 and the display unit 100 displays the first and second left-eye images $L_1$ and $L_2$ corresponding to the light transmitting portion TA of the third barrier pattern B3. An eighth appropriate visible image d-image8 is an image appearing at the appropriate visible distance d in an eighth case in which the barrier unit 200 includes the fourth barrier pattern B4 and the display unit 100 displays the first and second left-eye images $L_1$ and $L_2$ corresponding to the light transmitting portion TA of the fourth barrier pattern B4. Thus, d-image1 to d-image8 in FIG. 11 show the eight images obtained at the appropriate visible distance d when the respective first through fourth barrier patterns B1 to B4 are used when the first and second right-eye images R1 and R2 are displayed corresponding to the light transmitting portion TA of the barrier pattern (d-image 1 to d-image 4) or the first and second left-eye images L1 and L2 are displayed corresponding to the light transmitting portion TA of the barrier pattern (d-image5 to d-image8).

As an example, in FIG. 11 the first to eighth appropriate visible images d-image1 to d-image8 are, by use of the barrier patterns in barrier unit 200 in connection with the right-eye images or left-eye images shown in display panel 100, sequentially shifted to the first direction D1 by a width corresponding to one-fourth (E/4) of the binocular distance E.

The control unit 400 controls the barrier unit 200 to set the configuration of the barrier unit 200 to one of the first to fourth barrier patterns B1 to B4 corresponding to each area of the display unit 100.

In addition, the control unit 400 controls the display unit 100 to set the display unit 100 to display the first and second right-eye images $R_1$ and $R_2$ corresponding to the light transmitting portion TA or the first and second left-eye images $L_1$ and $L_2$ corresponding to the light transmitting portion TA when the barrier unit 200 forms each of the first, second, third, and fourth barrier patterns B1, B2, B3, and B4.

In FIG. 11, for the convenience of explanation, the barrier unit 200 that forms the first to fourth barrier patterns B1 to B4 has been shown, but four barrier units are not required to form the first to fourth barrier patterns B1 to B4.

The process of selecting the cases respectively proper to the first to fourth areas a1 to a4 among the first to eighth cases is substantially the same as those described with reference to FIG. 8, FIG. 9, FIG. 10A, and FIG. 10B, and thus details thereof will be omitted.

Figure 12:
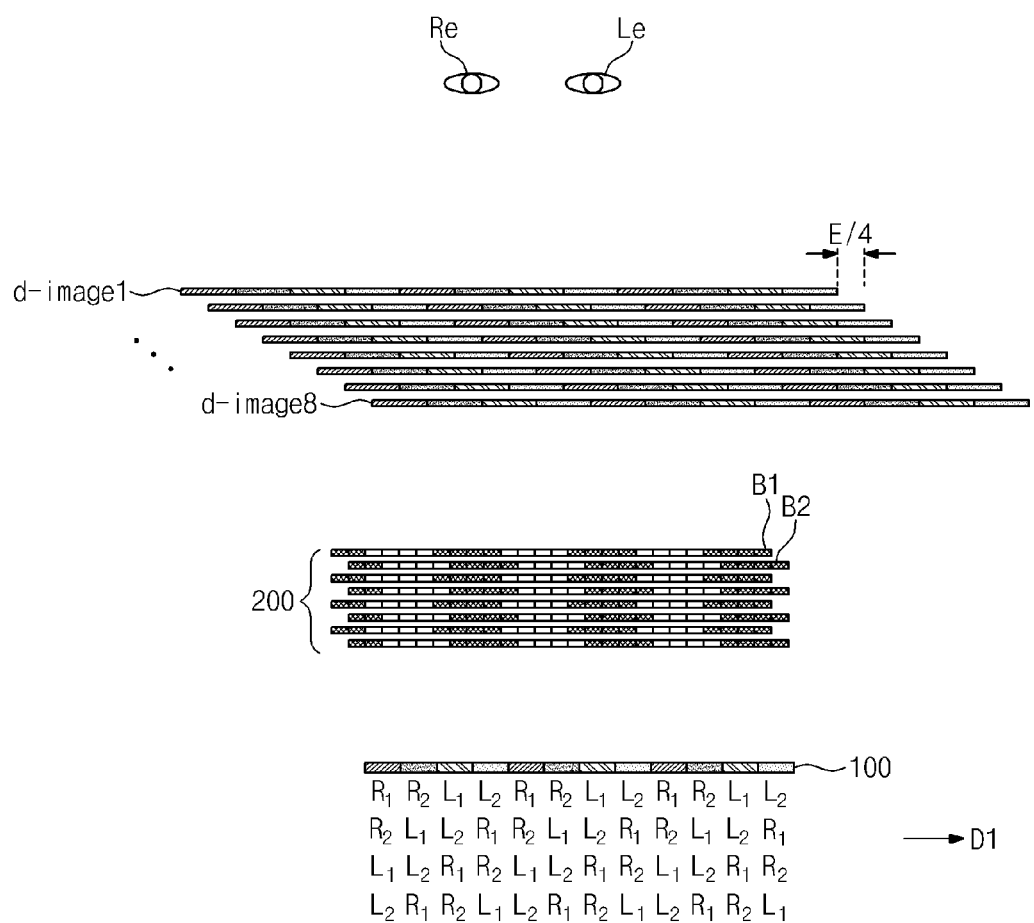
FIG. 12 is a view showing an appropriate visible image when an exemplary embodiment of a barrier pattern according to the invention includes first and second barrier patterns.

FIG. 12 is a view showing an appropriate visible image when another exemplary embodiment of a barrier pattern includes two barrier patterns and in which the display unit 100 alternates (in four rotations) the positions in which the first and second right eye $R_1$ and $R_2$ and the first and second left eye images $L_1$ and $L_2$ are displayed.

Referring to FIG. 12, the barrier unit 200 may form first and second barrier patterns B1 and B2 above the display unit 100. That is, the barrier unit 200 moves the light transmitting portion TA and the light blocking portion BA by the width of one electrode two times to form the first and second barrier patterns B1 and B2. Accordingly, the first and second barrier patterns B1 and B2 are each configured so that the light transmitting portion TA is sequentially shifted to the first direction D1 by the width of one electrode. In other words, the light transmitting portion of the second barrier patterns B2 is shifted by a width of one electrode to the first direction D1 from a start point of the light transmitting portion TA of the first barrier pattern B1.

In addition, the display unit 100 displays the first and second left-eye images $L_1$ and $L_2$ and the first and second right-eye images $R_1$ and $R_2$ after shifting the first and second left-eye images $L_1$ and $L_2$ and the first and second right-eye images $R_1$ and $R_2$ by one pixel in the first direction D1 when the barrier unit 200 forms each of the first and second barrier patterns B1 and B2.

In FIG. 12, a first appropriate visible image d-image1 is an image appearing at the appropriate visible distance d in a first case in which the barrier unit 200 includes the first barrier pattern B1 and the display unit 100 displays the first and second right-eye images $R_1$ and $R_2$ corresponding to the light transmitting portion TA of the first barrier pattern B1. A second appropriate visible image d-image2 is an image appearing at the appropriate visible distance d in a second case in which the barrier unit 200 includes the second barrier pattern B2 and the display unit 100 displays the first and second right-eye images $R_1$ and $R_2$ corresponding to the light transmitting portion TA of the second barrier pattern B2.

A third appropriate visible image d-image3 is an image appearing at the appropriate visible distance d in a third case in which the barrier unit 200 includes the first barrier pattern B1 and the display unit 100 displays the second left-eye images $L_2$ and the first right-eye image $R_1$ corresponding to the light transmitting portion TA of the first barrier pattern B1. A fourth appropriate visible image d-image4 is an image appearing at the appropriate visible distance d in a fourth case in which the barrier unit 200 includes the second barrier pattern B2 and the display unit 100 displays the second left-eye images $L_2$ and the first right-eye image $R_1$ corresponding to the light transmitting portion TA of the second barrier pattern B2.

In FIG. 12, a fifth appropriate visible image d-image5 is an image appearing at the appropriate visible distance d in a fifth case in which the barrier unit 200 includes the first barrier pattern B1 and the display unit 100 displays the first and second left-eye images $L_1$ and $L_2$ corresponding to the light transmitting portion TA of the first barrier pattern B1. A sixth appropriate visible image d-image6 is an image appearing at the appropriate visible distance d in a sixth case in which the barrier unit 200 includes the second barrier pattern B2 and the display unit 100 displays the first and second left-eye images $L_1$ and $L_2$ corresponding to the light transmitting portion TA of the second barrier pattern B2.

A seventh appropriate visible image d-image7 is an image appearing at the appropriate visible distance d in a seventh case in which the barrier unit 200 includes the first barrier pattern B1 and the display unit 100 displays the second right-eye images $R_2$ and the first left-eye image $L_1$ corresponding to the light transmitting portion TA of the first barrier pattern B1. An eighth appropriate visible image d-image8 is an image appearing at the appropriate visible distance d in an eighth case in which the barrier unit 200 includes the second barrier pattern B2 and the display unit 100 displays the second right-eye images $R_2$ and the first left-eye image $L_1$ corresponding to the light transmitting portion TA of the second barrier pattern B2. Thus, images d-image1 to d-image8 in FIG. 12 show the eight images obtained at the appropriate visible distance d when the respective two different barrier unit patters are used with display unit 100 displaying the first and second right-eye images R1 and R2 and the first and second left-eye images are displayed corresponding to the light transmitting portion TA of the barrier pattern on the display unit 100 (i.e., rotated in a sequence of four positions).

As an example, in FIG. 12 the first to eighth appropriate visible images d-image1 to d-image8 are, by use of the barrier patterns in barrier unit 200 and the rotation of the images in display panel 100, sequentially shifted to the first direction D1 by a width corresponding to one-fourth (E/4) of the binocular distance E.

The control unit 400 controls the barrier unit 200 to set the configuration of the barrier unit 200 to one of the first and second barrier patterns B1 and B2 corresponding to each area of the display unit 100.

In addition, the control unit 400 controls the display unit 100 to set the display unit 100 to display the first and second right-eye images $R_1$ and $R_2$, the second left-eye image L2 and the first right-eye image $R_1$, the first and second left-eye images $L_1$ and $L_2$, or the second right-eye image $R_2$ and the first left-eye image $L_1$ corresponding to the light transmitting portion TA when the barrier unit 200 forms each of the first and second barrier patterns B1 and B2.

In FIG. 12, for the convenience of explanation, the barrier unit 200 that forms the first and second barrier patterns B1 and B2 has been shown, but two barrier units are not required to form the first and second barrier patterns B1 and B2.

The process of selecting the cases respectively proper to the first to fourth areas a1 to a4 among the first to eighth cases is substantially the same as those described with reference to FIG. 8, FIG. 9, FIG. 10A, and FIG. 10B, and thus details thereof will be omitted.

Figure 13:
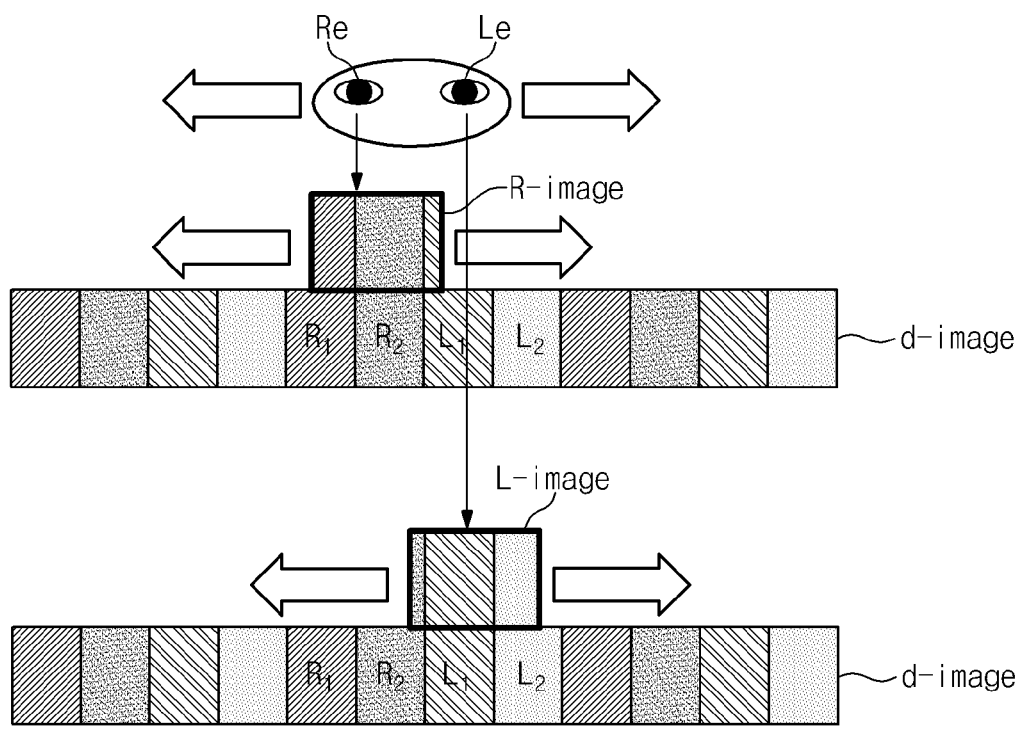
FIG. 13 is a view showing variations of images perceived by two eyes when the viewer moves to leftward and rightward.

FIG. 13 is a view showing variations of images perceived by two eyes when the viewer moves leftward and rightward with respect to the image (and the display unit 100 screen).

Referring to FIG. 13, when the viewer moves leftward at the observation distance h, the right-eye visible image R-image perceived by the right eye Re and the left-eye visible image L-image perceived by the left eye Le move leftward with reference to the appropriate visible image d-image. When the viewer moves rightward at the observation distance h, the right-eye visible image R-image perceived by the right eye Re and the left-eye visible image L-image perceived by the left eye Le move rightward with reference to the appropriate visible image d-image.

In the case in which the display unit 100 is divided into the areas with reference to the right eye Re, the process of setting the barrier pattern in each area to filter the right-eye visible image R-image that moves leftward or rightward is the same as that described with reference to FIG. 7 to FIG. 9, FIG. 10A, and FIG. 10B, and details thereof will be omitted in order to avoid redundancy.

Figure 14:
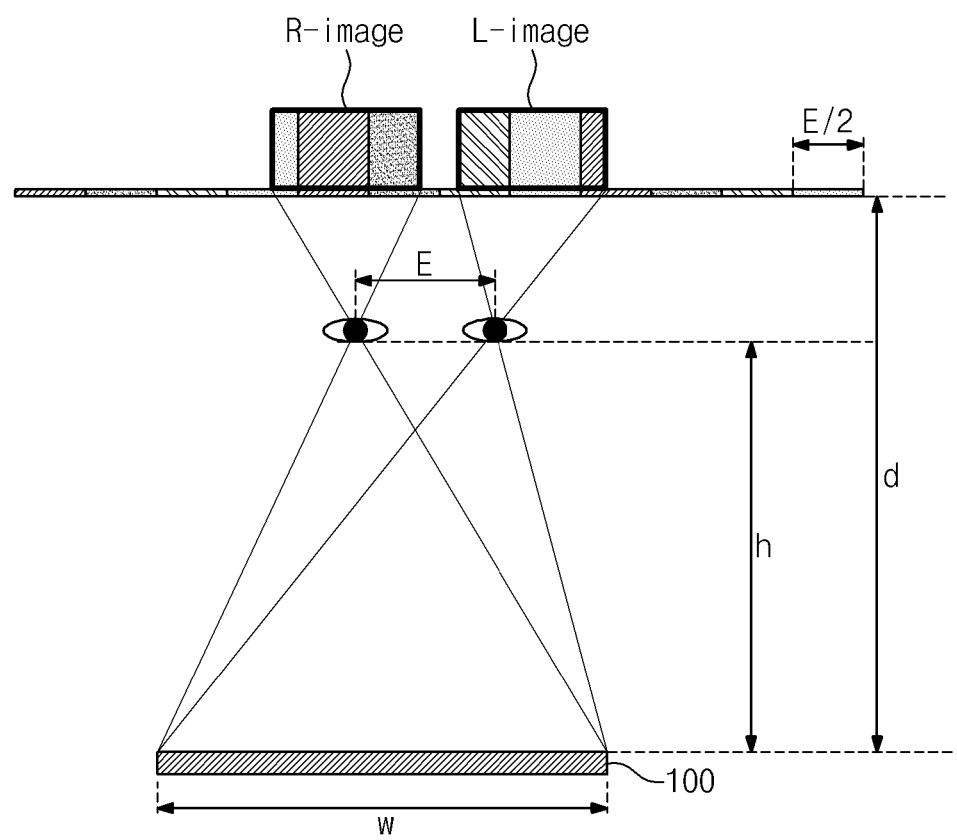
FIG. 14 is a view showing a right-eye image and a left-eye image respectively perceived by two eyes of the viewer when the observation distance is smaller than the appropriate visible distance.

FIG. 14 is a view showing the right-eye image and the left-eye image respectively perceived by two eyes of the viewer when the observation distance is smaller than the appropriate visible distance.

Referring to FIG. 14, when the viewer is located at a position closer to the display unit 100 than the appropriate visible distance d in the first range A1 in which the display unit 100 is operated in the two-sub-pixel mode, the viewer perceives an image that is different from the appropriate visible image d-image, which is the intended image.

In the case in which the observation distance h is smaller than the appropriate visible distance d the right eye Re of the viewer may perceive the first and second right-eye images $R_1$ and $R_2$, and additionally a portion of the second left-eye image $L_2$. Here, the image perceived by the right eye Re at the observation distance h may be defined as the right-eye visible image R-image.

In addition, in the case that the observation distance h is smaller than the appropriate visible distance d the left eye Le of the viewer may perceive the first and second left-eye images $L_1$ and $L_2$ and additionally a portion of the first right-eye image $R_1$. Here, the image perceived by the left eye Le at the observation distance h may be defined as the left-eye visible image L-image.

Accordingly, due to the binocular disparity, the viewer may perceive the 3D image at the observation distance h through the process of removing the second left-eye image component from the right-eye visible image R-image and the first right-eye image component from the left-eye visible image L-image.

As an example, a screen of the display unit 100 is divided into a plurality of areas each having a k/2 width corresponding to one of the two eyes of the viewer, and the barrier unit 200 includes a predetermined barrier pattern corresponding to each area. In the case in which the display unit 100 is divided into the areas with respect to the right eye Re of the viewer, the barrier pattern may be set in each area to remove the second left-eye image component from the right-eye visible image R-image.

In the case in which the display unit 100 is divided in the areas with reference to the right eye Re, the process of setting the barrier pattern in each area to filter the right-eye visible image R-image is the same as that described with reference to FIG. 7 to FIG. 9, FIG. 10A, and FIG. 10B, and details thereof will be omitted in order to avoid redundancy.

Figure 15:
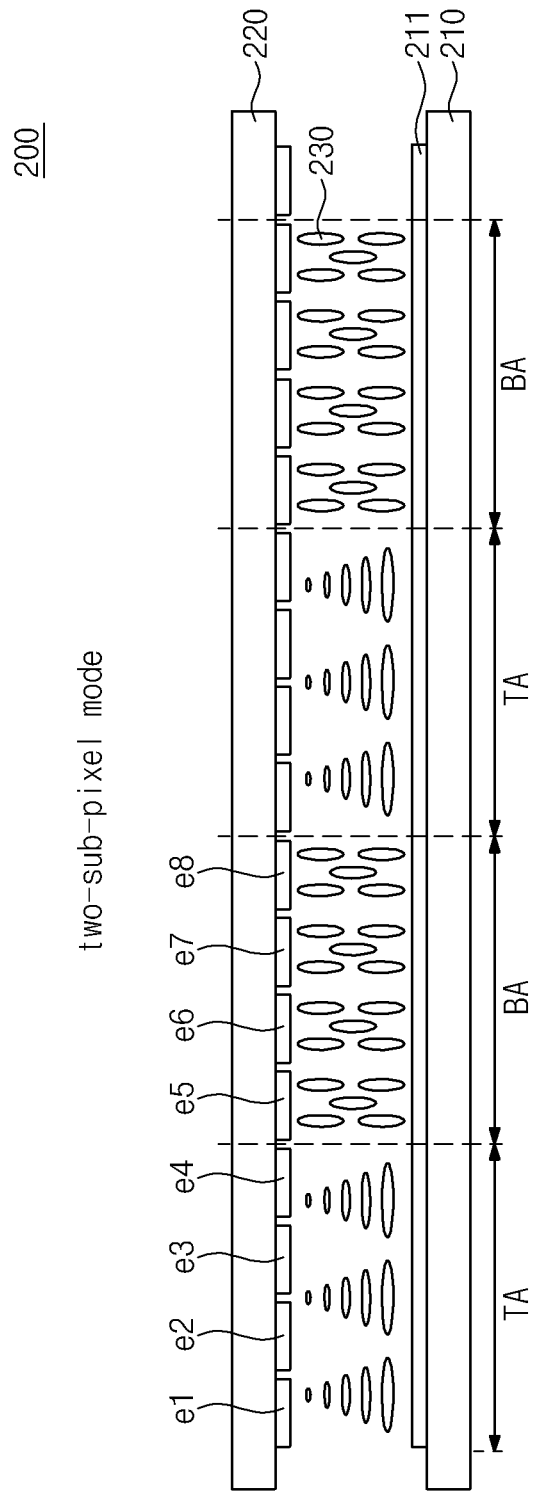
FIG. 15 is a cross-sectional view showing a barrier unit operated in two-sub-pixel mode.

FIG. 15 is a cross-sectional view showing a barrier unit operated in two-sub-pixel mode.

Referring to FIG. 15, the barrier unit 200 includes a first substrate 210, a second substrate 220 that faces the first substrate 210, and a liquid crystal layer 230 interposed between the first substrate 210 and the second substrate 220. A reference electrode 211 is disposed on the first substrate 210, and first to eighth electrodes e1 to e8 are disposed on the second substrate 220. The reference electrode 211 may be integrally formed as a single unitary and individual unit over the entire one surface of the first substrate 210. The first to eighth electrodes e1 to e8 are sequentially arranged in the first direction D1 to face the reference electrode 211.

The liquid crystal layer 230 includes twisted nematic liquid crystals. In addition, the liquid crystals may be a normally white liquid crystal. In the two-sub-pixel mode, when a reference voltage is applied to the reference electrode 211 and a driving voltage having the same voltage level as the reference voltage is applied to the first to fourth electrodes e1 to e4, areas in which the first to fourth electrodes e1 to e4 are formed that transmit light and are defined as the light transmitting portion TA. When the reference voltage is applied to reference electrode 211, and a driving voltage having a different voltage level from the reference voltage is applied to the fifth to eighth electrodes e5 to e8, areas in which the fifth to eighth electrodes e5 to e8 are formed that blocks light and are defined as the light blocking portion BA.

On the other hand, when a driving voltage having a different voltage level from the reference voltage is applied to the first to fourth electrodes e1 to e4, the areas in which the first to fourth electrodes e1 to e4 are formed block light and are defined as the light blocking portion BA, and when a driving voltage having the same voltage level as the reference voltage is applied the fifth to eighth electrodes e5 to e8, the areas in which the fifth to eighth electrodes e5 to e8 are formed transmit light and are defined as the light transmitting portion TA.

The barrier unit 200 may be operated in the two-sub-pixel mode because the voltage level of the driving voltage is controlled in the unit of four electrodes.

Although not shown in FIG. 15, the 3D image display apparatus 500 may further include polarizing plates respectively disposed at upper and lower portions of the barrier unit 200 and having absorption axes substantially perpendicular to each other.

Figure 16:
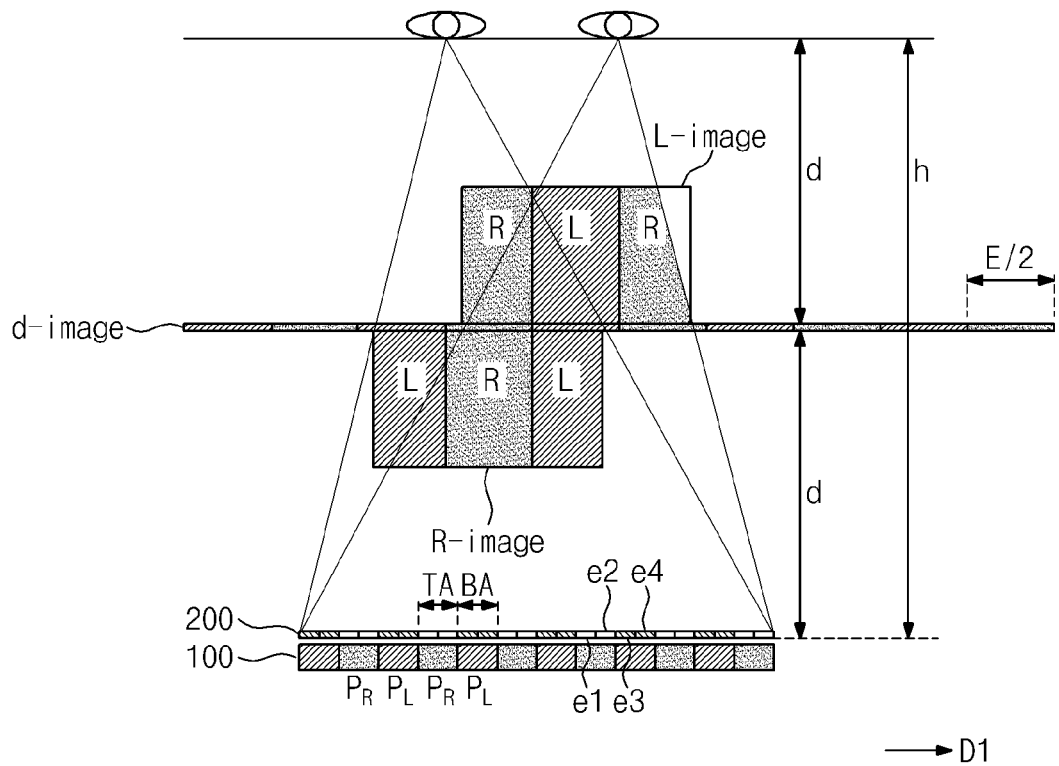
FIG. 16 is a view showing the observation distance two times greater than the appropriate visible distance.
Figure 17:
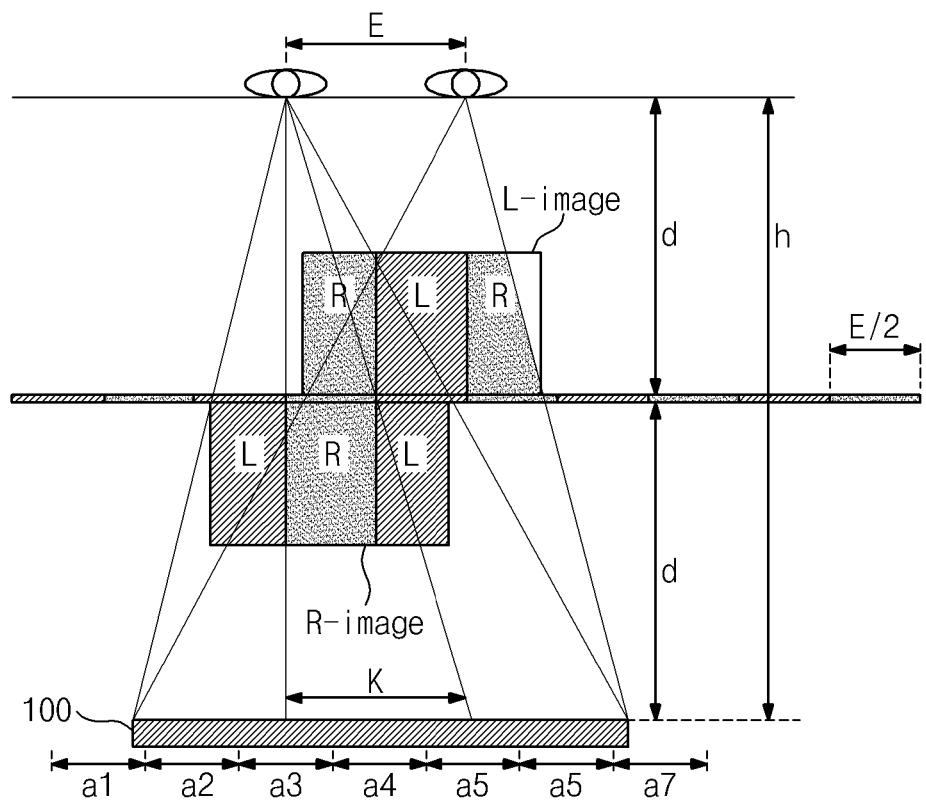
FIG. 17 is a view showing a right-eye image and a left-eye image respectively perceived by two eyes of the viewer when the observation distance is two times greater than the appropriate visible distance.

FIG. 16 is a view showing an observation distance that is two times greater than the appropriate visible distance, and FIG. 17 is a view showing the right-eye image and the left-eye image respectively perceived by two eyes of the viewer when the observation distance is two times greater than the appropriate visible distance.

Referring to FIG. 16, because the observation distance h, which is two times greater than the appropriate visible distance d, is within the second range A2 (refer to FIG. 2), the display unit 100 and the barrier unit 200 are operated in the one-sub-pixel mode.

In the one-sub-pixel mode, the display unit 100 displays the right-eye image R and the left-eye image L respectively through the right-eye pixel $P_R$ and the left-eye pixel $P_L$, which are alternately arranged with each other in the first direction D1. The barrier unit 200 includes the light transmitting portion TA and the light blocking portion BA alternately arranged in the first direction D1. The light transmitting portion TA is formed by the first and second electrodes e1 and e2 and the light blocking portion BA is formed by the third and fourth electrodes e3 and e4.

Because the right-eye image R is perceived by the right eye Re of the viewer at the appropriate visible distance d, the right eye Re of the viewer may perceive the right-eye image R and a portion of the left-eye image L in the case in which the observation distance h is two times greater than the appropriate visible distance d. Here, the image perceived by the right-eye Re at the observation distance h may be defined as the right-eye visible image R-image.

In addition, because the left-eye image L is perceived by the left eye Le of the viewer at the appropriate visible distance d, the left eye Le of the viewer may perceive the left-eye image L and a portion of the right-eye image R in the case in which the observation distance h is two times greater than the appropriate visible distance d. Here, the image perceived by the left-eye Le at the observation distance h may be defined as the left-eye visible image L-image.

Thus, due to the binocular disparity, the viewer may perceive the 3D image at the observation distance h through the process of removing the second left-eye image component from the right-eye visible image R-image and the first right-eye image component from the left-eye visible image L-image.

As an example, a screen of the display unit 100 is divided into a plurality of areas each having a k/2 width corresponding to one of the two eyes of the viewer. As shown in FIG. 17, the screen of the display unit 100 may be divided in to first to seventh areas a1 to a7 with reference to the right eye Re of the viewer when the viewer is located at a position corresponding to twice of the appropriate visible distance d.

According to Equations 3 and 4, the k depends on the observation distance h. That is, as the observation distance h is farther away from the appropriate visible distance d, the k decreases. Accordingly, the width in each area, which is set when the viewer is in the second range A2, may be smaller than the width in each area, which is set when the viewer is in the first range A1, and thus the number of the areas may be increased.

The barrier unit 200 includes a predetermined barrier pattern corresponding to each area. When assuming that the display unit 100 is divided into the areas with respect to the right eye of the viewer, the barrier pattern may be set in each area to remove the second left-eye image component from the right-eye visible image R-image.

Figure 18:
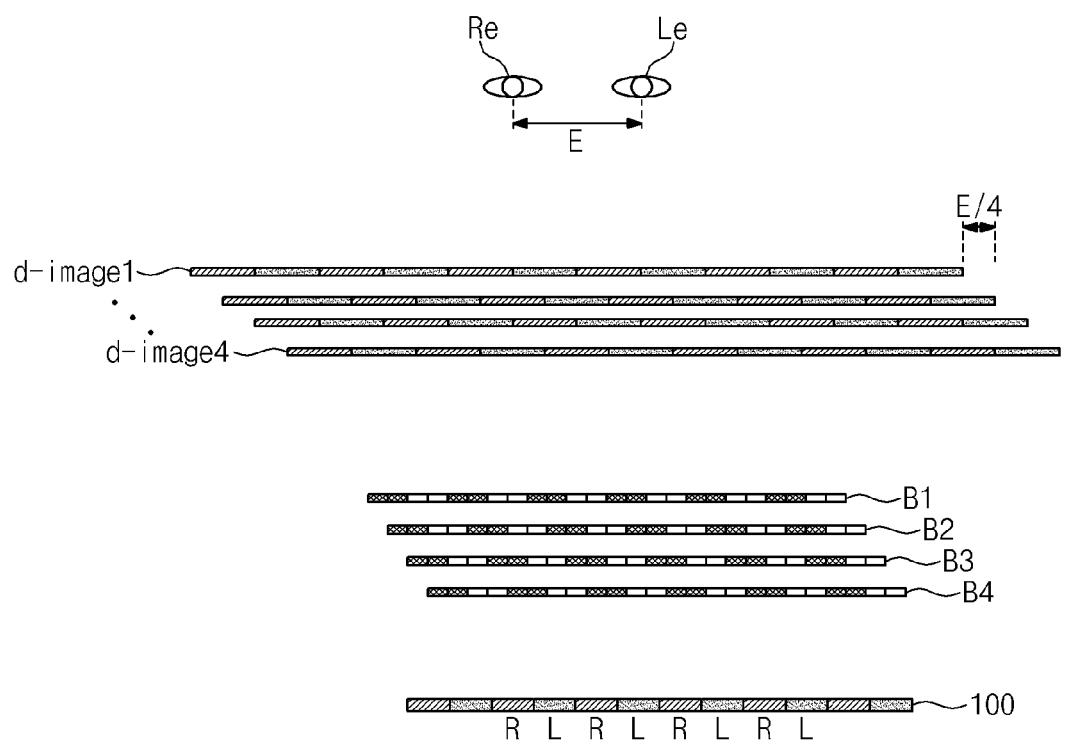
FIG. 18 is a view showing an appropriate visible image when a barrier unit includes first to fourth barrier patterns.
Figure 19:
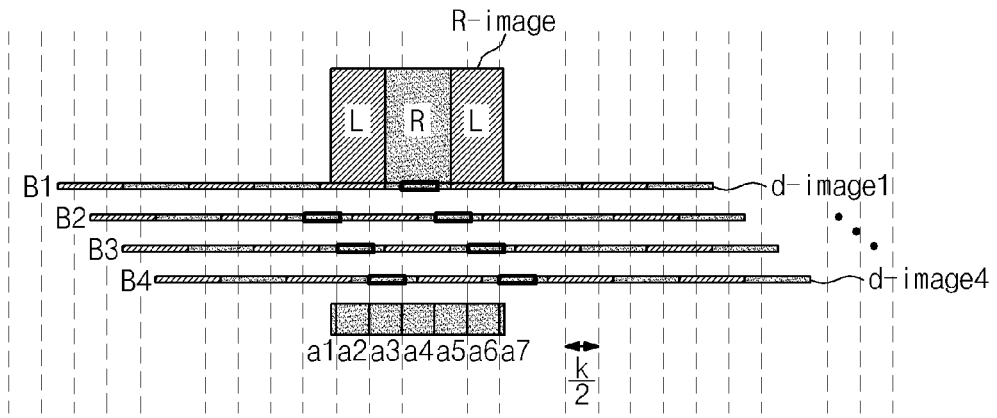
FIG. 19 is a view showing a process of filtering a right-eye visible image using a barrier pattern selected in respective first to seventh areas.
Figure 20:
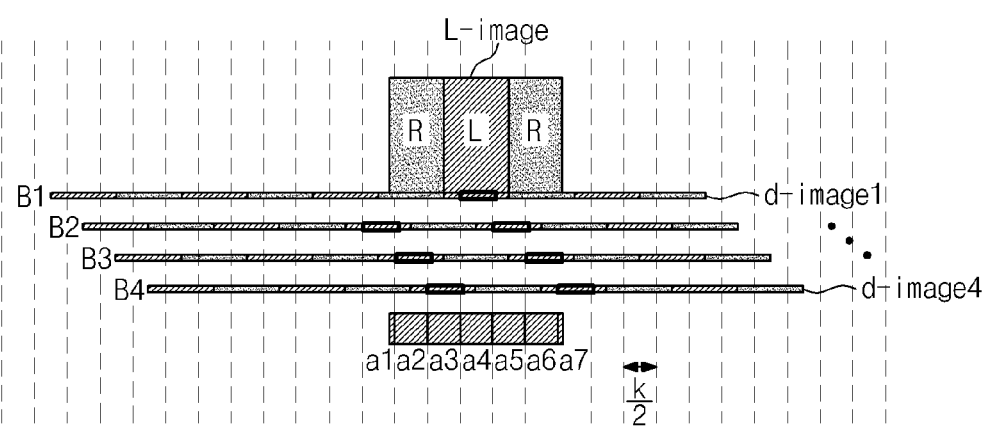
FIG. 20 is a view showing a process of filtering a left-eye visible image using a barrier pattern selected in respective first to seventh areas.

FIG. 18 to FIG. 20 are views showing processes of selecting the barrier pattern proper to each of the first to seventh areas. In detail, FIG. 18 is a view showing an appropriate visible image when the barrier unit includes four barrier patterns.

Referring to FIG. 18, the barrier unit 200 may form first, second, third, and fourth barrier patterns B1, B2 , B3, and B4 above the display unit 100. That is, the barrier unit 200 moves the light transmitting portion TA and the light blocking portion BA by the width of one electrode four times to form the first to fourth barrier patterns B1 to B4. Accordingly, the first to fourth barrier patterns B1 to B4 are each configured so that the light transmitting portion TA is sequentially shifted to the first direction D1 by the width of one electrode.

Meanwhile, in FIG. 18, the first appropriate visible image d-image1 is an image appearing at the appropriate visible distance d when the barrier unit 200 includes the first barrier pattern B1, and the second appropriate visible image d-image2 is an image appearing at the appropriate visible distance d when the barrier unit 200 includes the second barrier pattern B2 . The third appropriate visible image d-image3 and the fourth appropriate visible image d-image4 are images appearing at the appropriate visible distance d when the barrier unit 200 includes the third and fourth barrier patterns B3 and B4, respectively.

As an example, as shown in FIG. 18 the first to fourth appropriate visible images d-image1 to d-image4 are, by use of the barrier patterns in barrier unit 200 in connection with the right-eye images or left-eye images shown in display panel 100, sequentially shifted in the first direction D1 by a width corresponding to one-fourth (E/4) of the binocular distance E.

The control unit 400 controls the barrier unit 200 to set the barrier unit 200 to have one of the first to fourth barrier patterns B1 to B4 corresponding to each area of the display unit 100.

In FIG. 18, for the convenience of explanation, the barrier unit 200 that forms the first to fourth barrier patterns B1 to B4 has been shown, but four barrier units are not required to form the first to fourth barrier patterns B1 to B4.

FIG. 19 is a view showing a process of filtering the left-eye image component from the right-eye visible image using the barrier pattern selected in seven areas—respective first to seventh areas.

Referring to FIG. 19, among the first to fourth barrier patterns B1 to B4, a barrier pattern that allows only the right-eye image R to be perceived by the right eye Re of the viewer in each area is selected for each of the areas on the display panel 100.

In detail, when the second barrier pattern B2 is applied to the first area a1, only the right-eye image R is perceived by the right eye Re of the viewer. This can be seen in FIG. 19 in the bold boxes on d-image2 over area a1 that shows d-image2 only displaying the right eye image R. In addition, when the third barrier pattern B3 is applied to the second area a2, only the right-eye image R is perceived by the right eye Re of the viewer, when the fourth barrier pattern B4 is applied to the third area a3, only the right-eye image R is perceived by the right eye Re of the viewer, and when the first barrier pattern B1 is applied to the fourth area a4, only the right-eye image R is perceived by the right eye Re of the viewer. In addition, when the second barrier pattern B2 is applied to the fifth area a5, only the right-eye image R is perceived by the right eye Re of the viewer, when the third barrier pattern B3 is applied to the sixth area a6, only the right-eye image R is perceived by the right eye Re of the viewer, and when the fourth barrier pattern B4 is applied to the seventh area a7, only the right-eye image R is perceived by the right eye Re of the viewer.

Accordingly, the barrier unit 200 may form the second barrier pattern B2 , the third barrier pattern B3, the fourth barrier pattern B4, the first barrier pattern B1, the second barrier pattern B2 , the third barrier pattern B3, and the fourth barrier pattern B4 respectively corresponding to the first, second, third, fourth, fifth, sixth, and seventh areas a1, a2, a3, a4, a5, a6, and a7.

As described above, when the barrier unit 200 including the above-mentioned barrier pattern is applied to each area, the left-eye image component is filtered from the right-eye visible image R-image, so that only the right-eye image R is perceived by the right eye Re of the viewer.

FIG. 20 is a view showing a process of filtering a left-eye visible image using a barrier pattern selected in seven areas—respective first to seventh areas.

Referring to FIG. 20, when the second barrier pattern B2 , the third barrier pattern B3, the fourth barrier pattern B4, the first barrier pattern B1, the second barrier pattern B2, the third barrier pattern B3, and the fourth barrier pattern B4, which are set with reference to the right eye Re of the viewer, are respectively applied to the first, second, third, fourth, fifth, sixth, and seventh areas a1, a2, a3, a4, a5, a6, and a7, the right-eye image component is filtered from the left-eye visible image L-image.

Figure 21:
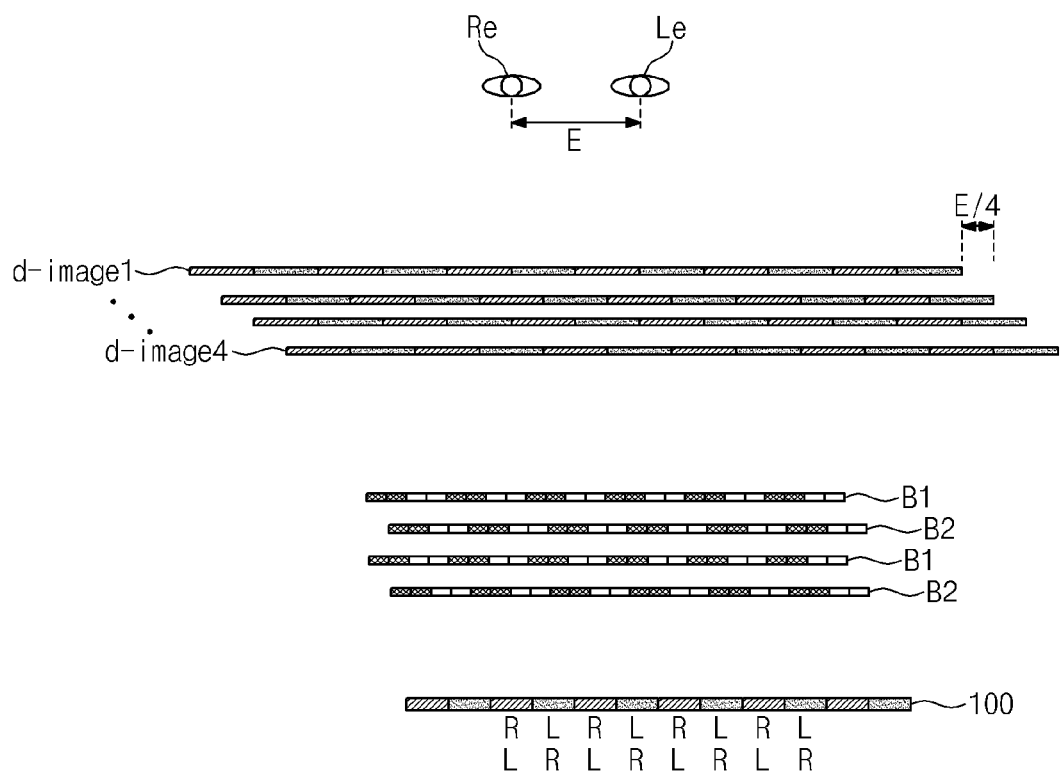
FIG. 21 is a view showing an appropriate visible image when a barrier pattern according to another exemplary embodiment includes first and second barrier patterns.

FIG. 21 is a view showing an appropriate visible image when another exemplary embodiment of a barrier pattern includes four barrier patterns and in which the display unit 100 alternates the positions in which the right eye image and the left eye image are displayed.

Referring to FIG. 21, the barrier unit 200 may form first and second barrier patterns B1 and B2 above the display unit 100. That is, the barrier unit 200 moves the light transmitting portion TA and the light blocking portion BA by the width of one electrode two time to form the first and second barrier patterns B1 and B2 . Accordingly, the first and second barrier patterns B1 and B2 have the shape in which the light transmitting portion TA is sequentially shifted to the first direction D1 by the width of one electrode.

In addition, when the barrier unit 200 forms the first and second barrier patterns B1 and B2, the display unit 100 displays the right-eye image R corresponding to the light transmitting portion TA or the left-eye image L corresponding to the light transmitting portion TA.

In FIG. 21, a first appropriate visible image d-image1 is an image appearing at the appropriate visible distance d in a first case in which the barrier unit 200 includes the first barrier pattern B1 and the display unit 100 displays the right-eye images R corresponding to the light transmitting portion TA of the first barrier pattern B1. A second appropriate visible image d-image2 is an image appearing at the appropriate visible distance d in a second case in which the barrier unit 200 includes the second barrier pattern B2 and the display unit 100 displays the right-eye images R corresponding to the light transmitting portion TA of the second barrier pattern B2.

A third appropriate visible image d-image3 is an image appearing at the appropriate visible distance d in a third case in which the barrier unit 200 includes the first barrier pattern B1 and the display unit 100 displays the left-eye images L corresponding to the light transmitting portion TA of the first barrier pattern B1. A fourth appropriate visible image d-image4 is an image appearing at the appropriate visible distance d in a fourth case in which the barrier unit 200 includes the second barrier pattern B2 and the display unit 100 displays the left-eye images L corresponding to the light transmitting portion TA of the second barrier pattern B2. Thus, d-image1 to d-image4 in FIG. 21 show the four images obtained at the appropriate visible distance d when the respective first and second barriers B1 and B2 are used when the right-eye images R are displayed corresponding to the light transmitting portion TA of the barrier pattern or the left-eye images L are displayed corresponding to the light transmitting portion TA of the barrier pattern.

As an example, in FIG. 21 the first to fourth appropriate visible images d-image1 to d-image4 are, by use of the barrier unit 200 in connection with the right eye image or left-eye image shown in display panel 100, sequentially shifted to the first direction D1 by a width corresponding to one-fourth (E/4) of the binocular distance E.

The control unit 400 controls the barrier unit 200 set the configuration of the barrier unit 200 to one of the first and second barrier patterns B1 and B2 corresponding to each area of the display unit 100.

In addition, the control unit 400 controls the display unit 100 to set the display unit 100 to display the right-eye image R corresponding to the light transmitting portion TA or the left-eye image L corresponding to the light transmitting portion TA when the barrier unit 200 forms the first and second barrier patterns B1 and B2.

In FIG. 21, for the convenience of explanation, the barrier unit 200 that forms the first and second barrier patterns B1 and B2 has been shown, but two barrier units are not required to form the first and second barrier patterns B1 and B2.

The process of selecting the cases respectively proper to the first to seventh areas a1 to a7 among the first to fourth cases is substantially the same as those described with reference to FIG. 19 and FIG. 20, and thus details thereof will be omitted.

Figure 22:
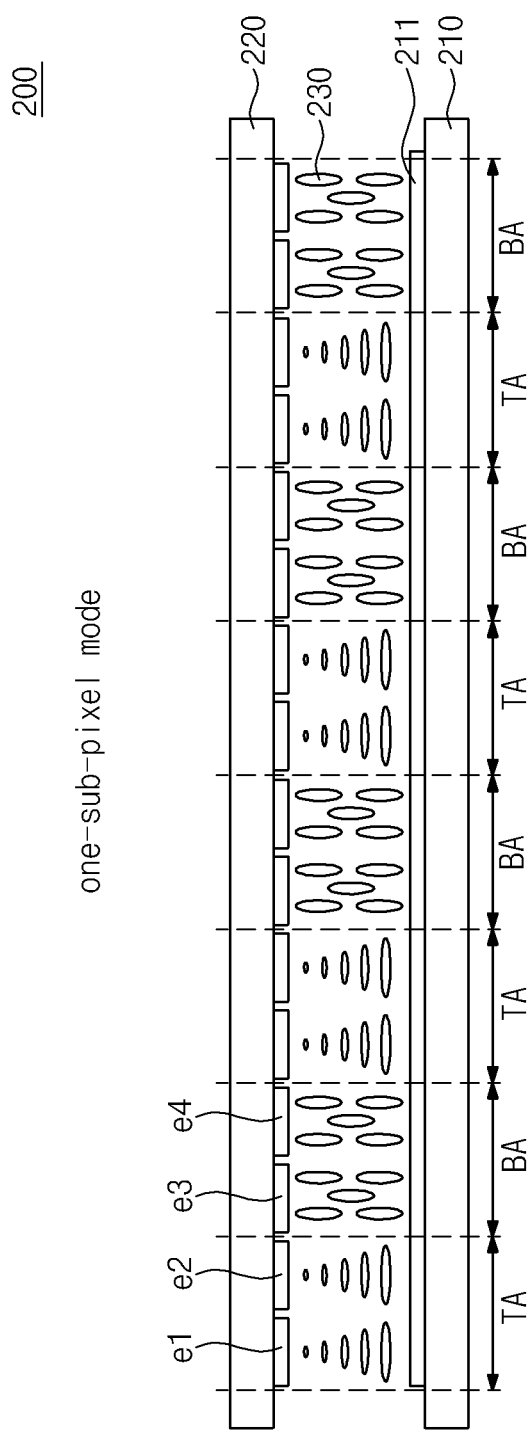
FIG. 22 is a cross-sectional view showing a barrier unit operated in one-sub-pixel mode.

FIG. 22 is a cross-sectional view showing a barrier unit operated in one sub-pixel mode.

Referring to FIG. 22, the barrier unit 200 includes a first substrate 210, a second substrate 220 that faces the first substrate 210, and a liquid crystal layer 230 interposed between the first substrate 210 and the second substrate 220. A reference electrode 211 is disposed on the first substrate 210, and first to fourth electrodes e1 to e4 are disposed on the second substrate 220. The reference electrode 211 may be integrally formed as a single unitary and individual unit over the entire one surface of the first substrate 210. The first to fourth electrodes e1 to e4 are sequentially arranged in the first direction D1 to face the reference electrode 211.

The liquid crystal layer 230 includes twisted nematic liquid crystals. In addition, the liquid crystals may be a normally white liquid crystal. In the one-sub-pixel mode, when a reference voltage is applied to the reference electrode 211 and a driving voltage having the same voltage level as the reference voltage is applied to the first and second electrodes e1 and e2, areas in which the first and second electrodes e1 and e2 are formed transmits the light and are defined as the light transmitting portion TA. When the reference voltage is applied to the reference electrode 211 and a driving voltage having the different voltage level from the reference voltage is applied to the third and fourth electrodes e3 and e4, areas in which the third and fourth electrodes e3 and e4 are formed block light and are defined as the light blocking portion BA.

On the other hand, when a driving voltage having the different voltage level from the reference voltage is applied the first and second electrodes e1 and e2, the areas in which the first and second electrodes e1 and e2 are formed block light and are defined as the light blocking portion BA, and when a driving voltage having the same voltage level as the reference voltage are applied to the third and fourth electrodes e3 and e4, the areas in which the third and fourth e3 and e4 are formed transmit light and are defined as the light transmitting portion TA.

The barrier unit 200 may be operated in the one-sub-pixel mode because the voltage level of the driving voltage is controlled in the unit of two electrodes.

Figure 23:
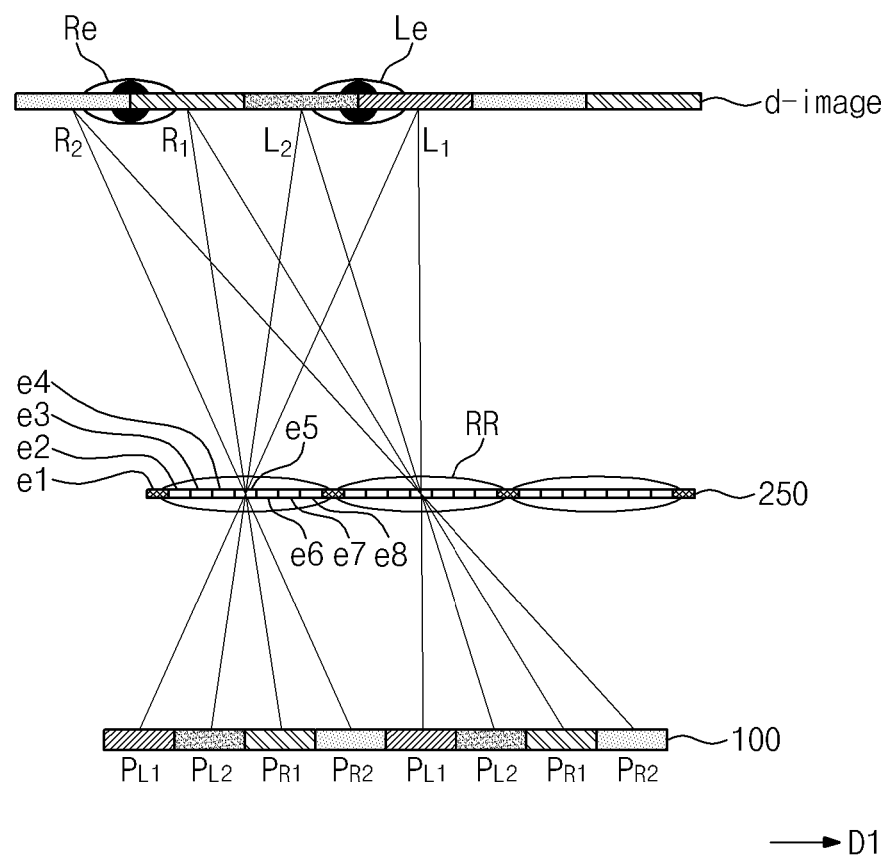
FIG. 23 is a cross-sectional view showing another exemplary embodiment of a 3D image display apparatus operated in two-sub-pixel mode.
Figure 24:
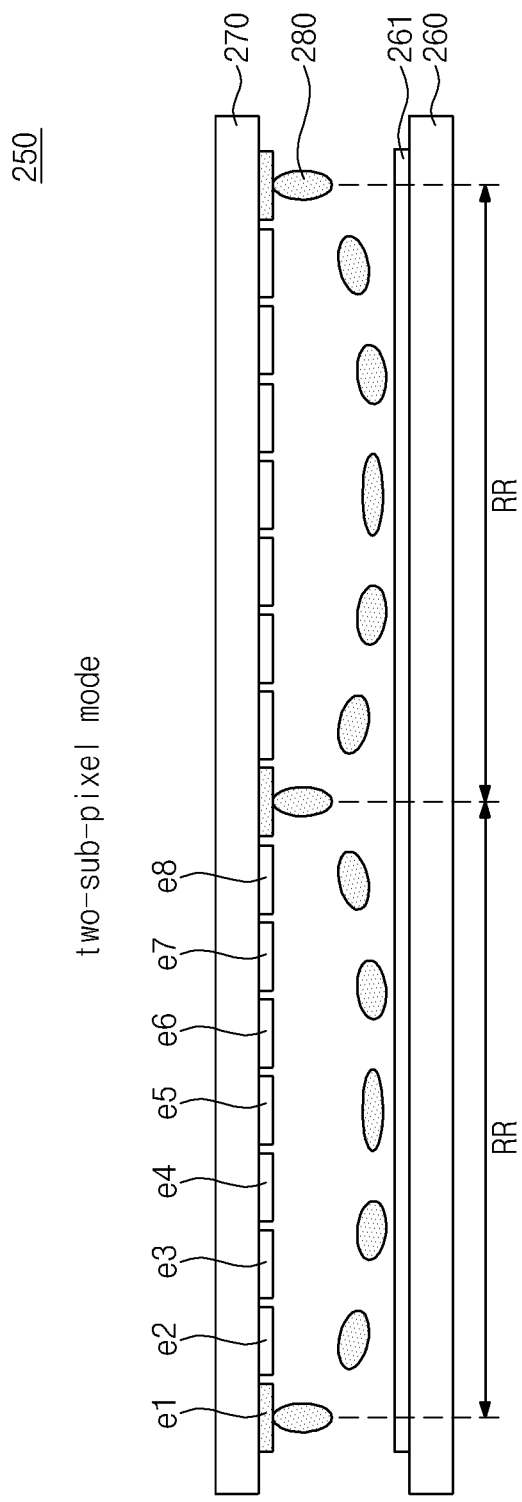
FIG. 24 is a cross-sectional view showing a lenticular unit shown in FIG. 23.

FIG. 23 is a cross-sectional view showing another exemplary embodiment of a 3D image display apparatus operated in two-sub-pixel mode, and FIG. 24 is a cross-sectional view showing a lenticular unit shown in FIG. 23.

Referring to FIG. 23, the display unit 100 displays first and second left-eye images $L_1$ and $L_2$ and first and second right-eye images $R_1$ and $R_2$ through first and second left-eye pixels $P_{L1}$ and $P_{L2}$ and first and second right-eye pixels $P_{R1}$ and $P_{R2}$, which are sequentially arranged in the first direction D1, during the two-sub-pixel mode. The lenticular unit 250 includes a plurality of lenticular lenses RR arranged along the first direction D1. The lenticular lenses are formed by first to eighth electrodes e1 to e8, respectively.

When the viewer watches the 3D image display apparatus 500 at the appropriate visible distance d, the right eye Re of the viewer perceives the first and second right-eye images $R_1$ and $R_2$ passing through the lenticular lenses RR and the left eye Le of the viewer perceives the first and second left-eye images $L_1$ and $L_2$ passing through the lenticular lenses RR. Accordingly, the viewer may perceive the image displayed on the display unit 100 as the 3D image due to the binocular disparity.

Here, the image perceived by the two eyes Re and Le of the viewer at the appropriate visible distance d may be defined as the appropriate visible image d-image. That is, when the viewer is located at the appropriate visible distance d in the two-sub-pixel mode, the viewer may perceive the optimal 3D image.

As shown in FIG. 24, the lenticular unit 250 includes a first substrate 260, a second substrate 270 that faces the first substrate 260, and a liquid crystal layer 280 interposed between the first substrate 260 and the second substrate 270. A reference electrode 261 is disposed on the first substrate 260 and first to eighth electrodes e1 to e8 are disposed on the second substrate 270. The reference electrode 261 may be integrally formed as a single unitary and individual unit over the entire one surface of the first substrate 260. The first to eighth electrodes e1 to e8 are sequentially arranged in the first direction D1 to face the reference electrode 261. Each of the first to eighth electrodes e1 to e8 may have a striped shape that extends in one direction and be spaced apart from each other at a predetermined distance to be parallel with each other.

The liquid crystal layer 280 includes twisted nematic liquid crystals. In addition, the liquid crystals may be a normally white liquid crystal. Liquid crystals that form one lenticular lens are controlled by the first to eighth electrodes e1 to e8. In the two-sub-pixel mode, a reference voltage is applied to the reference electrode 261 and driving voltages that are different from each other are applied to the first to eighth electrodes e1 to e8. In order to form the lenticular lenses RR in the striped shape, the first to eighth electrodes e1 to e8 may have the striped shape extended in one direction.

As described above, the lenticular unit 250 may be operated in the two-sub-pixel mode by controlling the voltage level of the driving voltage in the unit of eight electrodes.

Figure 25:
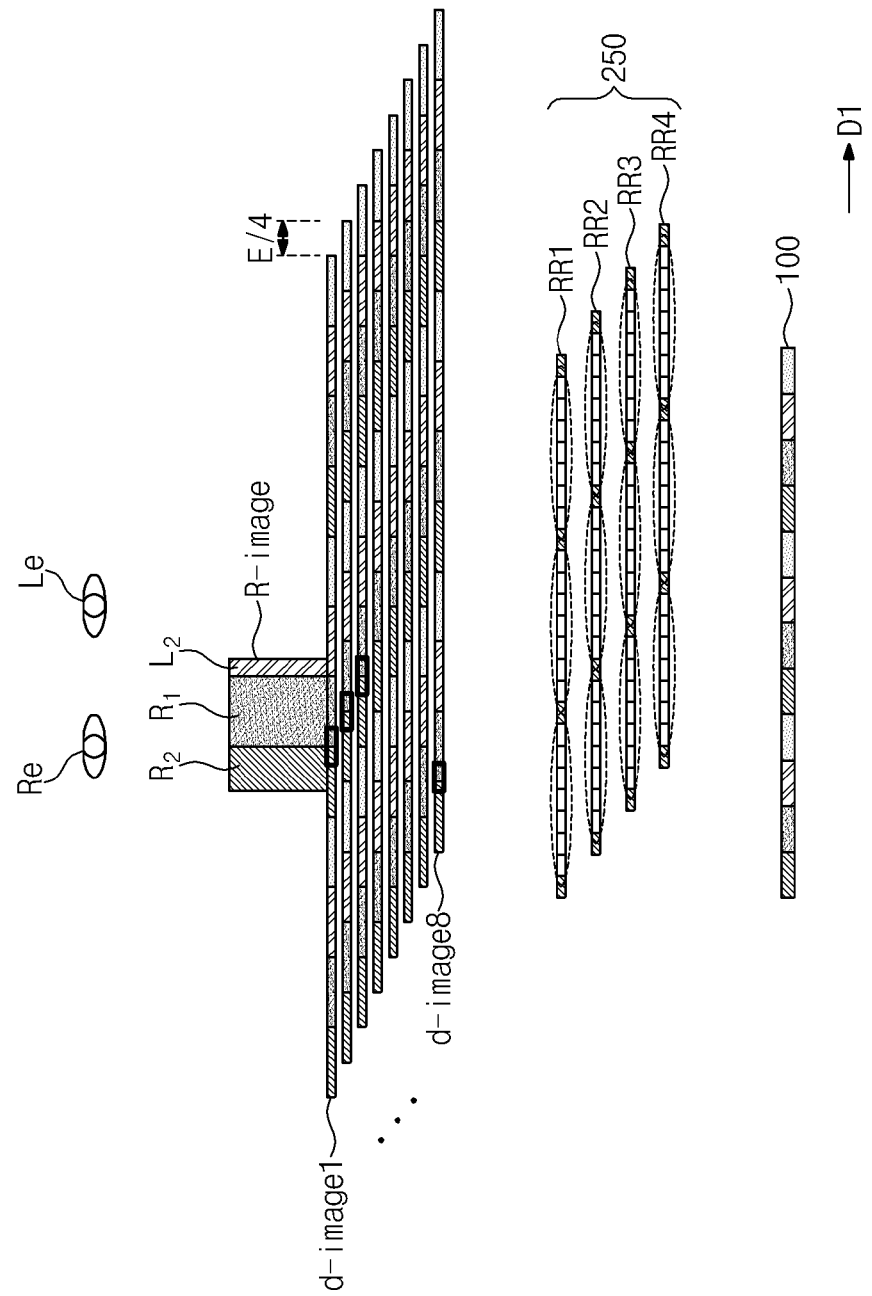
FIG. 25 is a view showing a process of setting a lenticular lens with foci respectively appropriate to areas of a display unit.

FIG. 25 is a view showing a process of setting a lenticular lens with foci respectively appropriate to areas of the display unit in the two-sub-pixel mode.

Referring to FIG. 25, the lenticular unit 250 may provide first to eighth lenticular patterns RR1, RR2, RR3, RR4, RR5, RR6, RR7, and RR8 above the display unit 100. That is, the lenticular unit 250 moves the lenticular lenses RR to the first direction D1 by the width of one electrode eight times to form the first to eighth lenticular patterns RR1 to RR8. Accordingly, the first to eighth lenticular patterns RR1 to RR8 are shaped so that each lenticular lens RR is sequentially shifted to the first direction D1 by the width of one electrode.

In FIG. 25, a first appropriate visible image d-image1 is an image appearing at the appropriate visible distance d when the lenticular unit 250 has the first lenticular pattern RR1, and a second appropriate visible image d-image2 is an image appearing at the appropriate visible distance d when the lenticular unit 250 has the second lenticular pattern RR2. A third appropriate visible image d-image3 and a fourth appropriate visible image d-image4 are images appearing at the appropriate visible distance d when the lenticular unit 250 has the third and fourth lenticular patterns RR3 and RR4, respectively. A fifth appropriate visible image d-image5 and a sixth appropriate visible image d-image6 are images appearing at the appropriate visible distance d when the lenticular unit 250 has the fifth and sixth lenticular patterns RR5 and RR6, respectively. A seventh appropriate visible image d-image7 and an eighth appropriate visible image d-image8 are images appearing at the appropriate visible distance d when the lenticular unit 250 has the seventh and eighth lenticular patterns RR7 and RR8, respectively.

As an example, the first to eighth appropriate visible images d-image1 to d-image8 are, by use of the lenticular unit 250, sequentially shifted to the first direction D1 by a width corresponding to one-fourth (E/4) of the binocular distance E.

The control unit 400 controls the lenticular unit 250 to set the configuration of the lenticular unit 250 to have one of the first to eighth lenticular patterns RR1 to RR8 corresponding to each area of the display unit 100.

In FIG. 25, for the convenience of explanation, the lenticular unit 250 that forms the first to eighth lenticular patterns RR1 to RR8 has been shown, but eight lenticular units are not required to form the first to eighth lenticular patterns RR1 to RR8.

When the viewer is farther away from the display unit 100 than the appropriate visible distance d in the first range A1 in which the display unit 100 is operated in the two-sub-pixel mode, the viewer perceives an image that is image from the appropriate visible image d-image.

When the viewer is at the appropriate visible distance d, the first and second right-eye images $R_1$ and $R_2$ are perceived by the right eye Re. In the case in which the observation distance is greater than the appropriate visible distance d, the first right-eye image $R_1$, the second right-eye image $R_2$, and a portion of the second left-eye image $L_2$ are perceived by the right eye Re of the viewer. Hereinafter, the image perceived by the right-eye Re at the observation distance h is referred to as a right-eye visible image R-image.

In addition, when the viewer is at the appropriate visible distance d, the first and second left-eye images $L_1$ and $L_2$ are perceived by the left eye Le of the viewer. In the case in which the observation distance h is greater than the appropriate visible distance d, the first left-eye image $L_1$, the second left-eye image $L_2$, and a portion of the first right-eye image $R_1$ are perceived by the left eye Le of the viewer. Hereinafter, the image perceived by the left-eye Le at the observation distance h is referred to as a left-eye visible image L-image.

Thus, when the observation distance is greater than h, if the second left-eye image component is removed from the right-eye visible image R-image, and the first right-eye image component is removed from the left-eye visible image L-image, the viewer may perceive the 3D image that is the image viewed at the observation distance h due to the binocular disparity of the two eyes.

As shown in FIG. 6, the display unit 100 may be divided into first, second, third, and fourth areas a1, a2, a3, and a4 with reference to the right eye of the viewer.

Among the first to eighth lenticular patterns RR1 to RR8, the lenticular pattern that allows only the first and second right-eye images $R_1$ and $R_2$ to be perceived by the right eye Re of the viewer in each area is selected in each of the areas.

In detail, when the eighth lenticular pattern RR8 is applied to the first area a1, the right eye Re of the viewer perceives only the first and second right-eye images $R_1$ and $R_2$. In addition, when the first lenticular pattern RR1 is applied to the second area a2, the right eye Re of the viewer perceives only the first and second right-eye images $R_1$ and $R_2$. When the second lenticular pattern RR2 is applied to the third area a3, the right eye Re of the viewer perceives only the first and second right-eye images $R_1$ and $R_2$. Further, when the third lenticular pattern RR3 is applied to the fourth area a4, the right eye Re of the viewer perceives only the first and second right-eye images $R_1$ and $R_2$.

Thus, the lenticular unit 250 may form the eighth lenticular pattern RR8, the first lenticular pattern RR1, the second lenticular pattern RR2, and the third lenticular pattern RR3 respectively corresponding to the first, second, third, and fourth areas a1, a2, a3, and a4.

As described above, when the lenticular unit 250 having the above-described lenticular pattern is applied to each area, the first left-eye image component is filtered from the right-eye visible image R-image, and thus the right eye Re of the viewer may perceive only the first and second right-eye images $R_1$ and $R_2$.

Although not shown in FIG. 25, when the lenticular unit 250 forms the eighth lenticular pattern RR8, the first lenticular pattern RR1, the second lenticular pattern RR2, and the third lenticular pattern RR3 to respectively correspond to the first, second, third, and fourth areas a1, a2, a3, and a4, the first right-eye image component may be filtered from the left-eye visible image L-image.

Figure 26:
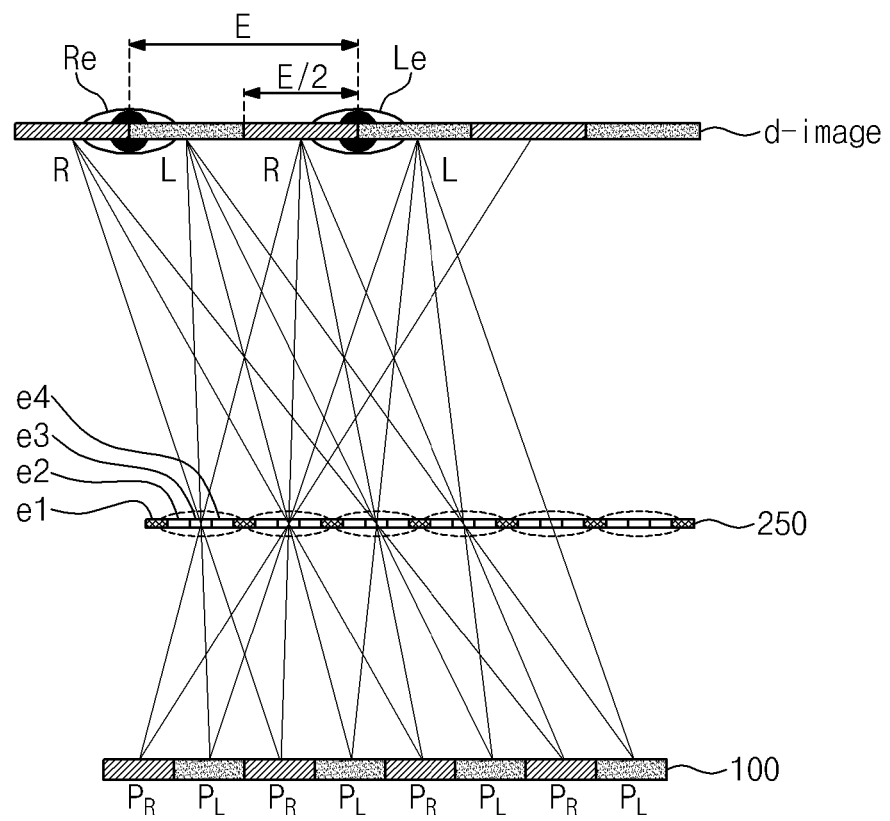
FIG. 26 is a cross-sectional view showing another exemplary embodiment of a 3D image display apparatus operated in one-sub-pixel mode.
Figure 27:
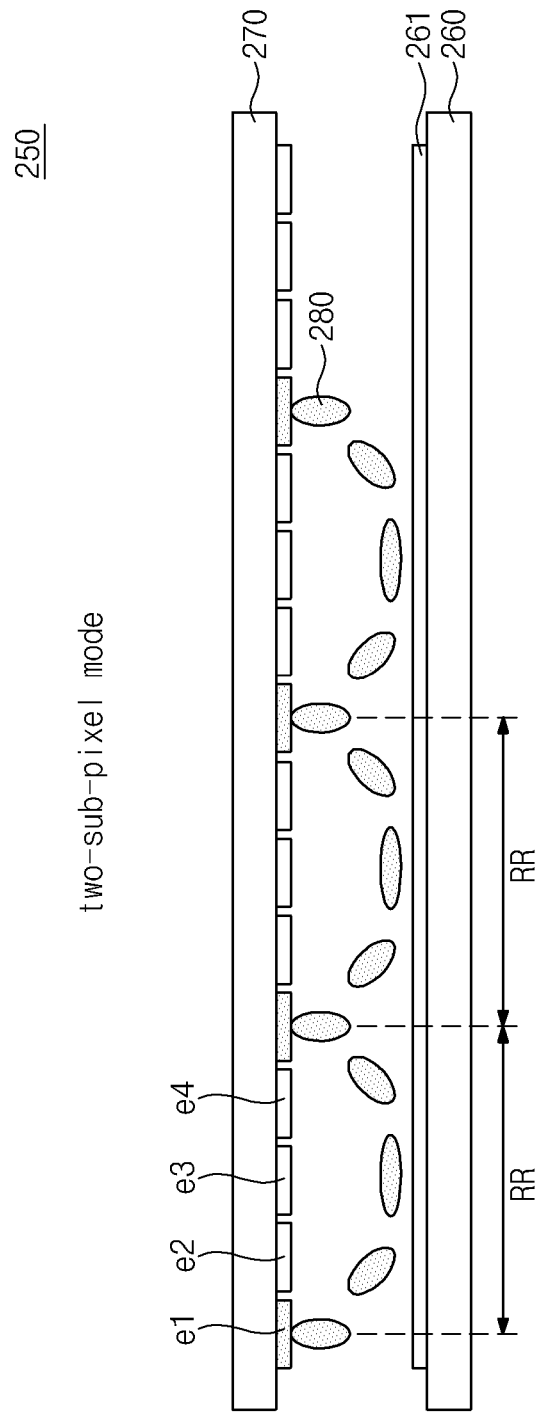
FIG. 27 is a cross-sectional view showing a lenticular unit shown in FIG. 26.

FIG. 26 is a cross-sectional view showing another exemplary embodiment of a 3D image display apparatus operated in one sub-pixel mode, and FIG. 27 is a cross-sectional view showing a lenticular unit shown in FIG. 26.

Referring to FIG. 26, in the one-sub-pixel mode, the display unit 100 displays the right-eye image R and the left-eye image L through the right-eye pixel $P_R$ and the left-eye pixel $P_L$, which are alternately arranged with each other in the first direction D 1. The lenticular unit 250 includes a plurality of lenticular lenses RR arranged in the first direction D1. Each of the lenticular lenses RR is formed by first to fourth electrodes e1 to e4.

When the viewer watches the 3D image display apparatus 500 at the appropriate visible distance d, the right eye Re of the viewer perceives the right-eye image R passing through the lenticular lenses RR and the left eye Le of the viewer perceives the left-eye image L passing through the lenticular lenses RR. Thus, the viewer may perceive the image displayed on the display unit 100 as the 3D image due to the binocular disparity between two eyes Re and Le of the viewer.

Here, the image perceived by the two eyes of the Re and Le of the viewer at the appropriate visible distance d may be defined as an appropriate visible image d-image. That is, when the viewer is located at the appropriate visible distance d in the one-sub-pixel mode, the viewer may perceive the optimal 3D image.

As shown in FIG. 27, the lenticular unit 250 includes a first substrate 260, a second substrate 270 that faces the first substrate 260, and a liquid crystal layer 280 interposed between the first substrate 260 and the second substrate 270. A reference electrode 261 is disposed on the first substrate 260 and first to fourth electrodes e1 to e4 are disposed on the second substrate 270. The reference electrode 261 may be integrally formed as a single unitary and individual unit over the entire one surface of the first substrate 260. The first to fourth electrodes e1 to e4 are sequentially arranged along the first direction D1 to face the reference electrode 261.

The liquid crystal layer 280 includes twisted nematic liquid crystals. In addition, the liquid crystals may be a normally white liquid crystal. In the one-sub-pixel mode, a reference voltage is applied to the reference electrode 261 and driving voltages that are different from each other are applied to the first to fourth electrodes e1 to e4.

As described above, the lenticular unit 250 may be operated in the one-sub-pixel mode by controlling the voltage level of the driving voltage in the unit of four electrodes.

Although not shown in figures, in the one-sub-pixel mode, the process of setting the lenticular lens having the focus appropriate to each area of the display unit 100 is substantially the same as the process of setting the lenticular lens having the focus appropriate to each area of the display unit 100 in the two-sub-pixel mode, and details thereof will be omitted in order to avoid redundancy.

Although the exemplary embodiments have been described, it is understood that the present invention should not be limited to these exemplary embodiments but various changes and modifications can be made by one ordinary skilled in the art within the spirit and scope of the present disclosure including the following claims.

What is claimed is:

1. A 3D image display apparatus comprising:
a display unit which includes a plurality of pixels and alternately displays a left-eye image in a first group of the pixels and a right-eye image in a second group of pixels along a first direction;
a barrier unit which includes a light blocking portion blocking a light received from the display unit and a light transmitting portion transmitting the light received from the display unit, the light blocking portion and the light transmitting portion being alternately arranged in the first direction;
a position information extraction unit which determines a distance between the display unit and a viewer watching the display unit; and
a control unit that controls the display unit and the barrier unit in accordance with the distance to allow the display unit and the barrier unit to be operated in a first mode or a second mode,
wherein the display unit alternately displays the left-eye image and the right-eye image in a unit of 2n (n is an integer of 1 or more) pixels in the first mode, the barrier unit forms the light blocking portion and the light transmitting portion in a unit of 4n electrodes in the first mode, the display unit alternately displays the left-eye image and the right-eye image in a unit of n pixels in the second mode, and the barrier unit forms the light blocking portion and the light transmitting portion in a unit of 2n electrodes in the second mode.

2. The 3D image display apparatus of claim 1, wherein, a reference distance is defined as a distance between the display unit and the viewer watching the display unit that provides an appropriate 3D image to the viewer when the display unit and the barrier unit are operated in the first mode, a value k satisfies the following Equation, $$k = \left| \frac{hE}{2(h-d)} \right| \qquad \text{Equation}$$

where a value h denotes a distance (hereinafter, referred to as observation distance) between the viewer and the display unit, d denotes the reference distance, and E denotes a binocular distance of the viewer, and wherein a screen of the display unit is divided into a plurality of areas each having a width of k/2, and the barrier unit comprises a predetermined barrier pattern corresponding to each area.

3. The 3D image display apparatus of claim 2, wherein, when the n is 1, the display unit sequentially and repeatedly displays a first right-eye image, a second right-eye image, a first left-eye image, and a second left-eye image in a unit of four pixels while operated in the first mode, and the light transmitting portion of the barrier unit has a width corresponding to two pixels.

4. The 3D image display apparatus of claim 3, wherein the barrier pattern comprises one of first to eighth barrier patterns, and the second to eighth barrier pattern each have a pattern in which the light transmitting portions of the first barrier pattern is sequentially shifted respectively by a width of one electrode to the first direction from a start point of the light transmitting portion as compared to the previous barrier pattern.

5. The 3D image display apparatus of claim 4, wherein the control unit selects the barrier pattern among the first to eighth barrier patterns in each area to allow a right eye of the viewer to perceive the first and second right-eye images and controls the barrier unit to allow the barrier unit to form the selected barrier pattern corresponding to each area.

6. The 3D image display apparatus of claim 3, wherein the barrier pattern comprises one of first to fourth barrier patterns, and the second to fourth barrier patterns each have a pattern in which light transmitting portions of the first barrier pattern is sequentially shifted respectively by a width of one electrode to the first direction from a start point of the light transmitting portion as compared to the previous barrier pattern.

7. The 3D image display apparatus of claim 6, wherein, among a first case in which the display unit displays the first and second right-eye images through the light transmitting portion of the first barrier pattern, a second case in which the display unit displays the first and second right-eye images through the light transmitting portion of the second barrier pattern, a third case in which the display unit displays the first and second right-eye images through the light transmitting portion of the third barrier pattern, a fourth case in which the display unit displays the first and second right-eye images through the light transmitting portion of the fourth barrier pattern, a fifth case in which the display unit displays the first and second left-eye images through the light transmitting portion of the first barrier pattern, a sixth case in which the display unit displays the first and second left-eye images through the light transmitting portion of the second barrier pattern, a seventh case in which the display unit displays the first and second left-eye images through the light transmitting portion of the third barrier pattern, and an eighth case in which the display unit displays the first and second left-eye images through the light transmitting portion of the fourth barrier pattern, the control unit selects the case in which the first and second right-eye images are perceived by a right eye of the viewer in each area and controls the display unit and the barrier unit to be operated in the selected case corresponding to each area.

8. The 3D image display apparatus of claim 3, wherein the barrier pattern comprises one of first and second barrier patterns, and the second barrier pattern has a pattern in which the light transmitting portion of the first barrier pattern is shifted by a width of one electrode to the first direction from a start point of the light transmitting portion of the first barrier pattern.

9. The 3D image display apparatus of claim 8, wherein, among a first case in which the display unit displays the first and second right-eye images through the light transmitting portion of the first barrier pattern, a second case in which the display unit displays the first and second right-eye images through the light transmitting portion of the second barrier pattern, a third case in which the display unit displays the second right-eye image and a first left-eye image through the light transmitting portion of the first barrier pattern, a fourth case in which the display unit displays the second right-eye image and the first left-eye image through the light transmitting portion of the second barrier pattern, a fifth case in which the display unit displays the first and second left-eye images through the light transmitting portion of the first barrier pattern, a sixth case in which the display unit displays the first and second left-eye images through the light transmitting portion of the second barrier pattern, a seventh case in which the display unit displays the second left-eye image and the first right-eye image through the light transmitting portion of the first barrier pattern, and an eighth case in which the display unit displays the second left-eye image and the first right-eye image through the light transmitting portion of the second barrier pattern, the control unit selects the case in which the first and second right-eye images are perceived by a right eye of the viewer in each area and controls the display unit and the barrier unit to be operated in the selected case corresponding to each area.

10. The 3D image display apparatus of claim 3, wherein, when an image perceived by a right eye of the viewer at the observation distance is defined as a right-eye visible image, the areas comprise a reference area between a point shifted to the first direction by k/4 from a first point of the display unit and a point shifted to a second direction opposite to the first direction by the k/4 from the first point and areas sequentially formed to have a width of k/2 from second and third points respectively shifted to the first and second directions by the k/4 from the first point corresponding to a boundary between the first and second right-eye images in the right-eye visible image.

11. The 3D image display apparatus of claim 2, wherein, when the observation distance (h) satisfies the following Equation $$\frac{8d}{11} \le h,$$

the control unit operates the display unit and the barrier unit in the first mode.

12. The 3D image display apparatus of claim 2, wherein the n is 1, the display unit sequentially and repeatedly displays the right-eye image and the left-eye image in a unit of two pixels during the second mode, and the light transmitting portion of the barrier unit has a width corresponding to one pixel.

13. The 3D image display apparatus of claim 12, wherein the barrier pattern comprises one of first to fourth barrier patterns, and the light transmitting portions of the second to fourth barrier patterns are sequentially shifted respectively by widths respectively corresponding to one, two, and three electrodes to the first direction from a start point of the light transmitting portion of the first barrier pattern.

14. The 3D image display apparatus of claim 13, wherein the control unit selects the barrier pattern among the first to fourth barrier patterns in each area to allow a right eye of the viewer to perceive the right-eye image and controls the barrier unit to allow the barrier unit to form the selected barrier pattern corresponding to each area.

15. The 3D image display apparatus of claim 12, wherein the barrier pattern comprises one of first and second barrier patterns, and the light transmitting portion of the second barrier pattern is shifted by a width of one electrode to the first direction from a start point of the light transmitting portion of the first barrier pattern.

16. The 3D image display apparatus of claim 15, wherein, among a first case in which the display unit displays the right-eye image through the light transmitting portion of the first barrier pattern, a second case in which the display unit displays the right-eye image through the light transmitting portion of the second barrier pattern, a third case in which the display unit displays the left-eye image through the light transmitting portion of the first barrier pattern, and a fourth case in which the display unit displays the left-eye image through the light transmitting portion of the second barrier pattern, the control unit selects the case in which the right-eye image is perceived by the right eye of the viewer in each area and controls the display unit and the barrier unit to be operated in the selected case corresponding to each area.

17. The 3D image display apparatus of claim 12, when an image perceived by a right eye of the viewer at the observation distance is defined as a right-eye visible image, the areas comprise a reference area between a point shifted to the first direction by k/4 from a first point of the display unit and a point shifted to a second direction opposite to the first direction by the k/4 from the first point and areas sequentially formed to have a width of k/2 from second and third points respectively shifted to the first and second directions by the k/4 from the first point corresponding to a boundary between the first and second right-eye images in the right-eye visible image.

18. The 3D image display apparatus of claim 2, wherein, when the observation distance (h) satisfies the following Equation $$\frac{8d}{5} < h,$$

the control unit operates the display unit and the barrier unit in the second mode.

19. The 3D image display apparatus of claim 1, wherein the barrier unit comprises:
a reference electrode disposed on a first base substrate;
a plurality of electrodes disposed on a second base substrate facing the first base substrate to form an electric field in cooperation with the reference electrode, the electrodes being extended in a second direction and arranged along the first direction; and
a liquid crystal layer interposed between the reference electrode and the electrodes.

20. A 3D image display apparatus comprising:
a display unit which includes a plurality of pixels and alternately displays a left-eye image in a first group of the pixels and a right-eye image in a second group of the pixels along a first direction;
a lenticular unit which includes a plurality of lenses arranged in the first direction;
a position information extraction unit which determines a distance between the display unit and a viewer watching the display unit; and
a control unit which controls the display unit and the lenticular unit in accordance with the distance to allow the display unit and the lenticular unit to be operated in a first mode or a second mode,
wherein the display unit alternately displays the left-eye image and the right-eye image in a unit of 2n (n is an integer of 1 or more) pixels in the first mode, the lenticular unit forms the lenses in a unit of 8n electrodes in the first mode, the display unit alternately displays the left-eye image and the right-eye image in a unit of n pixels in the second mode, and the lenticular unit forms the lenses in a unit of 4n electrodes in the second mode.

21. The 3D image display apparatus of claim 20, wherein, a reference distance is defined as a distance between the display unit and the viewer watching the display unit that provide and appropriate 3D image to the viewer when the display unit and the lenticular unit are operated in the first mode, a value k satisfies the following Equation, $$k = \left| \frac{hE}{2(h-d)} \right| \qquad \text{Equation}$$

where a value h denotes a distance between the viewer and the display unit, d denotes the reference distance, E denotes a binocular distance of the viewer, and wherein a screen of the display unit is divided into a plurality of areas each having a width of k/2, and the lenticular unit forms the lenses each having a predetermined focus corresponding to each area.

22. The 3D image display apparatus of claim 21, wherein, when the n is 1, the display unit sequentially and repeatedly displays a first right-eye image, a second right-eye image, a first left-eye image, and a second left-eye image in a unit of four pixels during the first mode, each of the lenses of the lenticular unit has a width corresponding to four pixels, and the lenticular unit comprises one of first to eighth lenticular patterns, each in which the focus of the lenses is sequentially shifted to the first direction by a width of one electrode.

23. The 3D image display apparatus of claim 22, wherein the control unit selects the lenticular pattern among the first to eighth lenticular patterns in each area to allow a right eye of the viewer to perceive the first and second right-eye images and controls the lenticular unit to allow the lenticular unit to form the selected lenticular pattern corresponding to each area.

24. The 3D image display apparatus of claim 21, wherein, when the n is 1, the display unit sequentially and repeatedly displays the right-eye image and the left-eye image in a unit of two pixels during the second mode, each of the lenses of the lenticular unit has a width corresponding to two pixels, and the lenticular unit comprises one of first to fourth lenticular patterns, each in which the focus of the lenses is sequentially shifted to the first direction by a width of one electrode.

25. The 3D image display apparatus of claim 24, wherein the control unit selects the lenticular pattern among the first to fourth lenticular patterns in each area to allow a right eye of the viewer to perceive the right-eye image and controls the lenticular unit to allow the lenticular unit to form the selected lenticular pattern corresponding to each area.

* * * * *